US010255638B2

(12) United States Patent
Cote et al.

(10) Patent No.: US 10,255,638 B2
(45) Date of Patent: Apr. 9, 2019

(54) SYSTEMS AND METHODS FOR SURFACE SEGMENT DATA

(71) Applicant: The Travelers Indemnity Company, Hartford, CT (US)

(72) Inventors: Gregory L. Cote, Granby, CT (US); Dean M. Collins, Manchester, CT (US); Beth S. Tirone, Hebron, CT (US); Christopher M. Hayes, Wethersfield, CT (US)

(73) Assignee: The Travelers Indemnity Company, Hartford, CT (US)

( * ) Notice: Subject to any disclaimer, the term of this patent is extended or adjusted under 35 U.S.C. 154(b) by 369 days.

(21) Appl. No.: 14/953,980

(22) Filed: Nov. 30, 2015

(65) Prior Publication Data

US 2016/0078554 A1    Mar. 17, 2016

Related U.S. Application Data

(63) Continuation of application No. 13/723,685, filed on Dec. 21, 2012, now abandoned.

(51) Int. Cl.
*G06Q 40/00* (2012.01)
*G06Q 40/08* (2012.01)
*G07C 5/00* (2006.01)

(52) U.S. Cl.
CPC ............ *G06Q 40/08* (2013.01); *G07C 5/008* (2013.01)

(58) Field of Classification Search
CPC ................................ G06Q 40/08; G07C 5/008
USPC ............................................................ 705/4
See application file for complete search history.

(56) References Cited

U.S. PATENT DOCUMENTS

| 6,064,970 | A  | 5/2000  | McMillan et al. |
| 6,931,309 | B2 | 8/2005  | Phelan et al.   |
| 7,188,026 | B2 | 3/2007  | Tzamaloukas     |
| 7,343,306 | B1 | 3/2008  | Bates et al.    |
| 7,516,041 | B2 | 4/2009  | Smartt et al.   |
| 7,610,210 | B2 | 10/2009 | Helitzer        |
| 7,701,363 | B1 | 4/2010  | Zlojutro        |
| 7,769,608 | B1 | 8/2010  | Woll            |
| 7,801,675 | B2 | 9/2010  | Currie et al.   |
| 7,949,491 | B2 | 5/2011  | Smartt et al.   |
| 7,957,893 | B2 | 6/2011  | Smartt          |
| 7,966,203 | B1 | 6/2011  | Pietrzak        |
| 7,987,260 | B2 | 7/2011  | Rogers et al.   |
| 8,022,845 | B2 | 9/2011  | Zlojutro        |

(Continued)

FOREIGN PATENT DOCUMENTS

| KR | 10-2001-0105182 | 11/2001 |
| KR | 10-2004-0105438 | 12/2004 |

(Continued)

OTHER PUBLICATIONS

Notice of Allowance for U.S. Appl. No. 13/334,897 dated Oct. 31, 2013, 9 pp.

(Continued)

*Primary Examiner* — Edward Chang
*Assistant Examiner* — Slade E Smith
(74) *Attorney, Agent, or Firm* — Fincham Downs LLC; Carson C. K. Fincham

(57) ABSTRACT

Systems, apparatus, interfaces, methods, and articles of manufacture that provide for acquisition, management, and/or utilization of surface segment data.

20 Claims, 14 Drawing Sheets

(56) References Cited

U.S. PATENT DOCUMENTS

| | | |
|---|---|---|
| 8,024,111 B1 | 9/2011 | Meadows et al. |
| 8,046,245 B1 | 10/2011 | Woll |
| 8,112,522 B2 | 2/2012 | Rogers et al. |
| 8,140,265 B2 | 3/2012 | Grush |
| 8,271,190 B2 | 9/2012 | Smartt |
| 8,280,395 B2 | 10/2012 | Tzamaloukas et al. |
| 8,289,187 B1 | 10/2012 | Kerr |
| 8,306,777 B2 | 11/2012 | Smartt et al. |
| 8,307,090 B2 | 11/2012 | Rogers et al. |
| 8,332,242 B1 | 12/2012 | Medina, III |
| 8,339,990 B1 | 12/2012 | Tzamaloukas |
| 8,340,898 B2 | 12/2012 | Currie et al. |
| 8,489,433 B2 | 7/2013 | Altieri et al. |
| 8,538,785 B2* | 9/2013 | Coleman ............... G06Q 40/08 705/4 |
| 8,566,021 B2 | 10/2013 | Smartt |
| 8,606,512 B1 | 12/2013 | Bogovich et al. |
| 8,606,516 B2 | 12/2013 | Vertelney et al. |
| 8,660,794 B2 | 2/2014 | Currie et al. |
| 8,744,762 B2 | 6/2014 | Coleman et al. |
| 8,996,303 B1 | 3/2015 | Bogovich et al. |
| 9,020,751 B1 | 4/2015 | Bogovich et al. |
| 9,053,591 B2 | 6/2015 | Phelan et al. |
| 9,189,895 B2 | 11/2015 | Phelan et al. |
| 9,196,098 B2 | 11/2015 | Phelan et al. |
| 9,269,202 B2 | 2/2016 | Phelan et al. |
| 9,421,981 B2 | 8/2016 | Phelan et al. |
| 9,421,982 B2 | 8/2016 | Phelan et al. |
| 9,637,134 B2 | 5/2017 | Phelan et al. |
| 9,727,920 B1* | 8/2017 | Healy ............... G06Q 40/08 |
| 9,851,214 B1* | 12/2017 | Chintakindi ....... G01C 21/3691 |
| 9,865,019 B2 | 1/2018 | Bogovich et al. |
| 9,932,033 B2 | 4/2018 | Slusar et al. |
| 9,996,883 B2 | 6/2018 | Bogovich et al. |
| 2002/0128882 A1 | 9/2002 | Nakagawa et al. |
| 2003/0187698 A1 | 10/2003 | Bonissone et al. |
| 2004/0153362 A1 | 8/2004 | Bauer et al. |
| 2005/0261943 A1 | 11/2005 | Quarterman et al. |
| 2006/0100912 A1 | 5/2006 | Kumar et al. |
| 2007/0225915 A1 | 9/2007 | Weinzapfel et al. |
| 2007/0282638 A1 | 12/2007 | Surovy |
| 2008/0189142 A1 | 8/2008 | Brown et al. |
| 2008/0228531 A1 | 9/2008 | Kenedy et al. |
| 2008/0288419 A1 | 11/2008 | Miles et al. |
| 2009/0037228 A1 | 2/2009 | Engel |
| 2011/0106370 A1 | 5/2011 | Duddle |
| 2011/0161116 A1 | 6/2011 | Peak et al. |
| 2011/0161119 A1 | 6/2011 | Collins |
| 2012/0029945 A1 | 2/2012 | Altieri et al. |
| 2012/0084103 A1 | 4/2012 | Alfieri |
| 2012/0166229 A1 | 6/2012 | Collins et al. |
| 2012/0173290 A1 | 7/2012 | Collins et al. |
| 2013/0179198 A1 | 7/2013 | Bowne et al. |
| 2014/0019170 A1 | 1/2014 | Coleman et al. |
| 2015/0246654 A1* | 9/2015 | Tadic ............... B60W 40/09 340/436 |

FOREIGN PATENT DOCUMENTS

| | | |
|---|---|---|
| KR | 10-2005-0042084 | 5/2005 |
| WO | WO2009012627 | 1/2009 |

OTHER PUBLICATIONS

European Search Report for EP 11 85 3501 dated May 27, 2014, 6 pp.

Office Action for U.S. Appl. No. 13/723,685 dated Jun. 12, 2014, 8 pp.

Office Action for U.S. Appl. No. 13/723,685 dated Jan. 5, 2015, 12 pp.

Final Office Action for U.S. Appl. No. 13/723,685 dated Jun. 30, 2015, 13 pp.

Connecticut Innovation Press Release, "Shizzlr Inc. Joins C Tech Incubator", Jan. 18, 2011; 1 pp.

St. Paul Pioneer Press, "Bar Cams Reveal Where the Action is", by Alex Friedrich, Mar. 17, 2008; 4 pp.

* cited by examiner

| | H1 | H2 | H3 | C1 | C2 | C3 | ... | RR1 | RR2 |
|---|---|---|---|---|---|---|---|---|---|
| BOB SMITH | 3 | 2 | 0 | 23 | 9 | 0 | ... | 45 | 2 |
| MARY JONES | 0 | 0 | 0 | 234 | 219 | 67 | ... | Y | N |
| TRANSCO | 934 | 0 | 632 | 0 | 45 | 0 | ... | LO | HI |

FIG. 8

SYSTEMS AND METHODS FOR SURFACE SEGMENT DATA

CROSS-REFERENCE TO RELATED APPLICATIONS

The present application claims benefit and priority to, and is a Continuation of, U.S. patent application Ser. No. 13/723,685 filed on Dec. 21, 2012 and titled "SYSTEMS AND METHODS FOR SURFACE SEGMENT DATA", the entirety of which is hereby incorporated by reference herein.

BACKGROUND

Insurance companies assess risk and calculate premiums for insurance products based on many factors and often utilize complex mathematical equations and models to do so. The accuracy with which these companies are able to assess, manage, and/or mitigate risk and properly price their premiums has great impact on their profitability and ultimate success. Yet, despite the importance of these functions to the insurance industry, previous practices have failed to take into account information that may greatly increase accuracy and reliability of risk assessment and premium determinations and the effectiveness and benefits of risk control measures.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 8 is block diagram of an exemplary data storage structure according to some embodiments;

DETAILED DESCRIPTION

Figure 1:
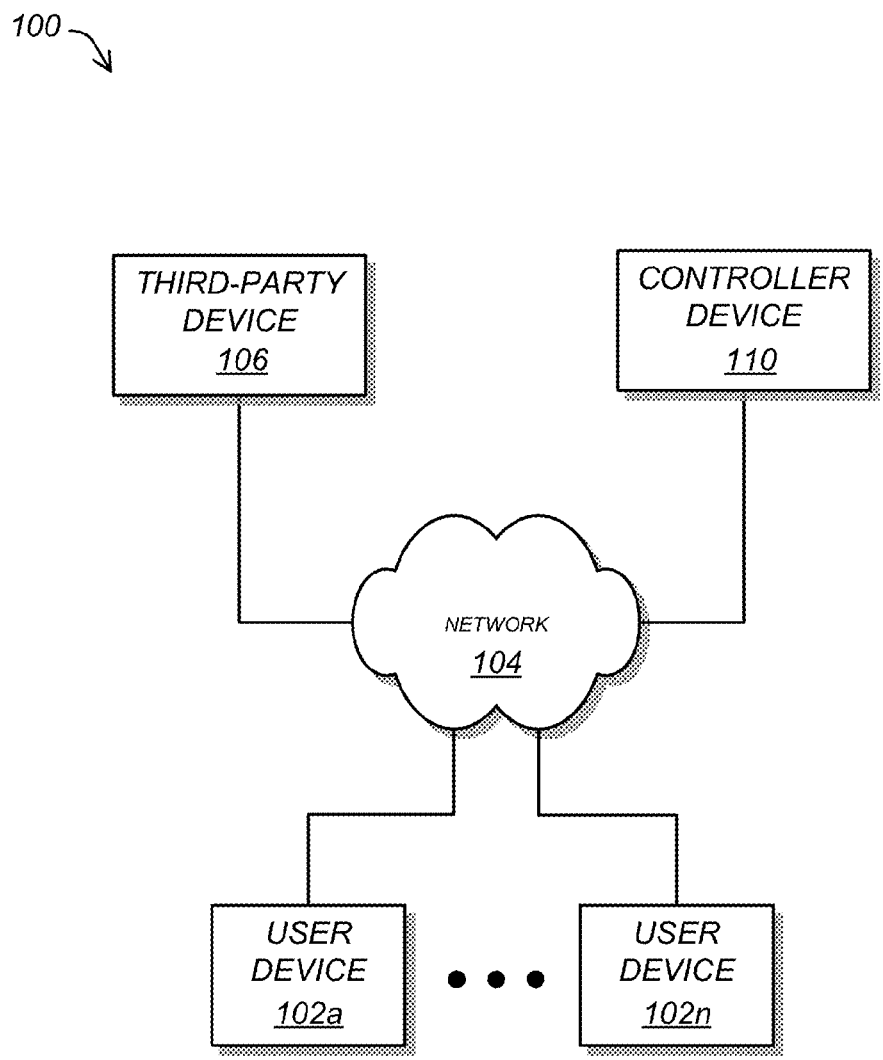
FIG. 1 is a block diagram of a system according to some embodiments.

Embodiments described herein are descriptive of systems, apparatus, methods, interfaces, and articles of manufacture for acquisition, management, and/or utilization of surface segment data. In some embodiments, for example, various characteristics of transportation (and/or other) segmentations may be monitored, aggregated, analyzed, tabulated, graphed, mapped, and/or otherwise processed and/or presented.

It may be beneficial, for example, for an insurance policy on an object (e.g., person, business, and/or thing/item) to be structured to take into account an amount of exposure of such an object to various surface segments having different characteristics. While standard automobile insurance policies are written to take into account certain specific types of risk (e.g., how many miles are driven per year and/or the age and/or gender of the primary driver), for example, such determinations are generic and are often mostly or entirely not in the control of the insured (e.g., the insured is not likely to change gender or switch jobs to reduce commuting mileage just to qualify for a lower insurance premium).

Accordingly, in some embodiments, systems, apparatus, methods, interfaces, and articles of manufacture may comprise gathering and/or aggregating or otherwise determining surface segment data associated with various areas and/or objects and utilizing such data in a manner that is beneficial, such as for use in assessing, rating, and/or pricing an insurance product. Insurance products may include any type of insurance products or services, including, but not limited to, property and casualty insurance (including, but not limited to, business/commercial insurance, auto/motor, personal property, real property, watercraft, aircraft, spacecraft, general liability, professional, D&O, E&O, employer liability, business torts, surety and fidelity bonds, product liability, or any other type of insurance coverage).

In some embodiments, insurance policies and/or premiums thereof may be based (at least in part) on surface segment data associated with a client and/or customer (and/or potential client and/or potential customer). An insurance company may, for example, determine surface segment data, process the surface segment, and/or determine insurance information (e.g., premium levels, surcharges, discounts, deductible levels, and/or rewards) based on the surface segment data.

As used herein the term "surface segment" may generally refer to a particular and/or identifiable portion of an object and/or area. Surface segments may include, for example (but are not limited to), a portion of a roadway, sidewalk, canal, waterway, airway, rail line, floor area, etc. In some embodiments, a surface segment may comprise a portion of a roadway having one or more common characteristics, such as pavement type, thickness, and/or geometric similarities (e.g., surface segment "physical characteristics"), and/or environmental similarities (e.g., surface segment "environmental characteristics"). In some embodiments, various objects and/or areas may be classified, categorized, and/or otherwise grouped or associated based on one or more surface segment characteristics. Surface segment characteristics may, in accordance with some embodiments, be described and/or indicated by one or more elements and/or representations of "surface segment data" (e.g., a sub-class of "information" and/or "data" as utilized herein).

Referring first to FIG. 1, a block diagram of a system 100 according to some embodiments is shown. In some embodiments, the system 100 may comprise a plurality of user devices 102a-n, a network 104, a third-party device 106, and/or a controller device 110. As depicted in FIG. 1, any or all of the devices 102a-n, 106, 110 (or any combinations thereof) may be in communication via the network 104. In some embodiments, the system 100 may be utilized to provide (and/or receive) surface segment and/or other data or metrics. The controller device 110 may, for example, interface with one or more of the user devices 102a-n and/or the third-party device 106 to acquire, gather, aggregate, process, and/or utilize surface segment and/or other data or metrics in accordance with embodiments described herein.

Fewer or more components 102a-n, 104, 106, 110 and/or various configurations of the depicted components 102a-n, 104, 106, 110 may be included in the system 100 without deviating from the scope of embodiments described herein. In some embodiments, the components 102a-n, 104, 106, 110 may be similar in configuration and/or functionality to similarly named and/or numbered components as described herein. In some embodiments, the system 100 (and/or portion thereof) may comprise an underwriting program and/or platform programmed and/or otherwise configured to execute, conduct, and/or facilitate any of the various methods 200, 400, 500, 700 of FIG. 2, FIG. 4, FIG. 5, and/or FIG. 7 and/or portions or combinations thereof described herein.

The user devices 102a-n, in some embodiments, may comprise any types or configurations of computing, mobile electronic, network, user, and/or communication devices that are or become known or practicable. The user devices 102a-n may, for example, comprise one or more Personal Computer (PC) devices, computer workstations (e.g., underwriter workstations), tablet computers such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user devices 102a-n may comprise devices owned and/or operated by one or more users such as underwriters, account managers, agents/brokers, customer service representatives, data acquisition partners and/or consultants or service providers, and/or underwriting product customers. According to some embodiments, the user devices 102a-n may communicate with the controller device 110 via the network 104, such as to conduct underwriting inquiries and/or processes utilizing surface segment data as described herein.

In some embodiments, the user devices 102a-n may interface with the controller device 110 to effectuate communications (direct or indirect) with one or more other user devices 102a-n (such communication not explicitly shown in FIG. 1), such as may be operated by other users. In some embodiments, the user devices 102a-n may interface with the controller device 110 to effectuate communications (direct or indirect) with the third-party device 106 (such communication also not explicitly shown in FIG. 1). In some embodiments, the user devices 102a-n and/or the third-party device 106 may comprise one or more sensors configured and/or coupled to sense, measure, calculate, and/or otherwise process or determine surface segment data. In some embodiments, such sensor data may be provided to the controller device 110, such as for utilization of the surface segment data in pricing, quoting, issuing, re-issuing, and/or selling or re-selling an underwriting product.

The network 104 may, according to some embodiments, comprise a Local Area Network (LAN; wireless and/or wired), cellular telephone, Bluetooth®, and/or Radio Frequency (RF) network with communication links between the controller device 110, the user devices 102a-n, and/or the third-party device 106. In some embodiments, the network 104 may comprise direct communications links between any or all of the components 102a-n, 106, 110 of the system 100. The user devices 102a-n may, for example, be directly interfaced or connected to one or more of the controller device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102a-n may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106, 110 of the system 100. The network 104 may comprise one or more cellular telephone networks with communication links between the user devices 102a-n and the controller device 110, for example, and/or may comprise the Internet, with communication links between the controller device 110 and the third-party device 106, for example.

The third-party device 106, in some embodiments, may comprise any type or configuration a computerized processing device such as a PC, laptop computer, computer server, database system, and/or other electronic device, devices, or any combination thereof. In some embodiments, the third-party device 106 may be owned and/or operated by a third-party (i.e., an entity different than any entity owning and/or operating either the user devices 102a-n or the controller device 110). The third-party device 106 may, for example, be owned and/or operated by a data and/or data service provider such as a municipality, utility location service, surveying entity, etc. In some embodiments, the third-party device 106 may supply and/or provide data such as surface segment and/or other data to the controller device 110 and/or the user devices 102a-n. In some embodiments, the third-party device 106 may comprise a plurality of devices and/or may be associated with a plurality of third-party entities.

In some embodiments, the controller device 110 may comprise an electronic and/or computerized controller device such as a computer server communicatively coupled to interface with the user devices 102a-n and/or the third-party device 106 (directly and/or indirectly). The controller device 110 may, for example, comprise one or more PowerEdge™ M910 blade servers manufactured by Dell®, Inc. of Round Rock, Tex. which may include one or more Eight-Core Intel® Xeon® 7500 Series electronic processing devices. According to some embodiments, the controller device 110 may be located remote from one or more of the user devices 102a-n and/or the third-party device 106. The controller device 110 may also or alternatively comprise a plurality of electronic processing devices located at one or more various sites and/or locations.

According to some embodiments, the controller device 110 may store and/or execute specially programmed instructions to operate in accordance with embodiments described herein. The controller device 110 may, for example, execute one or more programs that facilitate the utilization of surface segment data in the pricing and/or issuance one or more underwriting products. According to some embodiments, the controller device 110 may comprise a computerized processing device such as a PC, laptop computer, computer server, and/or other electronic device to manage and/or facilitate transactions and/or communications regarding the user devices 102a-n. An underwriter (and/or customer, client, or company) may, for example, utilize the controller device 110 to (i) price and/or underwrite one or more products such as insurance, indemnity, and/or surety products, (ii) determine and/or be provided with surface segment and/or other information, (iii) determine and/or be provided with surface segment and/or other information based on answers to underwriting questions, and/or (iv) provide an interface via which an underwriting entity may manage and/or facilitate underwriting of various products (e.g., in accordance with embodiments described herein).

Figure 2:
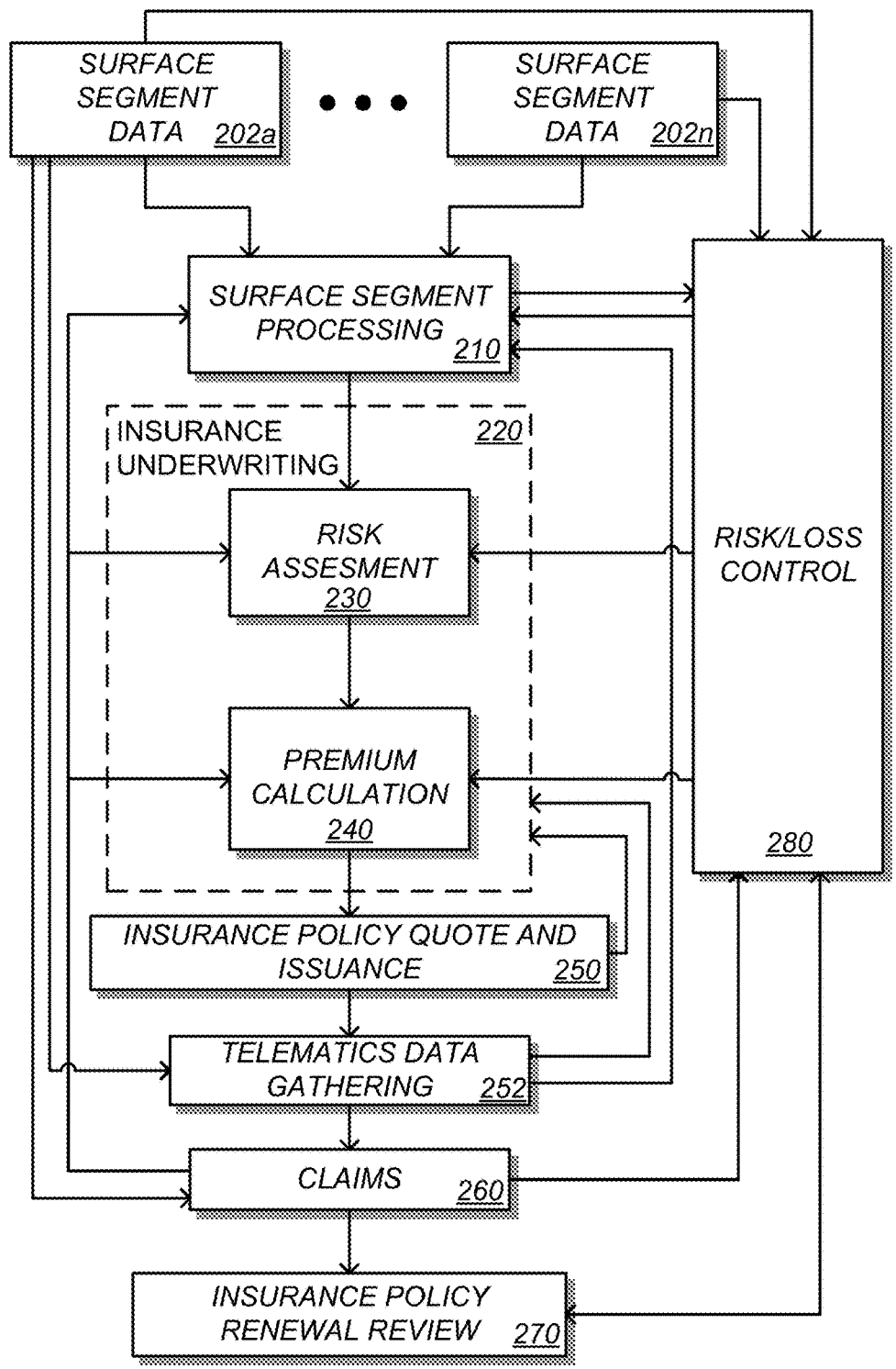
FIG. 2 is a flow diagram of a method according to some embodiments.

Referring now to FIG. 2, a flow diagram of a method 200 according to some embodiments is shown. In some embodiments, the method 200 may be performed and/or implemented by and/or otherwise associated with one or more specialized and/or specially-programmed computers (e.g., the user devices 102a-n, the third-party device 106, and/or the controller device 110, all of FIG. 1), computer terminals, computer servers, computer systems and/or networks, and/or any combinations thereof (e.g., by one or more insurance company and/or underwriter computers). The process diagrams and flow diagrams described herein do not necessarily imply a fixed order to any depicted actions, steps, and/or procedures, and embodiments may generally be performed in any order that is practicable unless otherwise and specifically noted. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage devices 340, 840, 1240a-d of FIG. 3, FIG. 8, FIG. 12A, FIG. 12B, FIG. 12C, and/or FIG. 12D herein) may store thereon instructions that when executed by a machine (such as a computerized processor) result in performance according to any one or more of the embodiments described herein.

According to some embodiments, the method 200 may comprise one or more actions associated with surface segment data 202a-n. The surface segment data 202a-n of one or more objects and/or areas that may be related to and/or otherwise associated with an insurance product and/or policy, for example, may be determined, calculated, looked-up, retrieved, and/or derived. In some embodiments, the surface segment data 202a-n may be gathered as raw data directly from one or more surface segment data sources as described herein and/or as otherwise configured to record data indicative of surface segment characteristics of the object and/or area.

As depicted in FIG. 2, surface segment data 202a-n from a plurality of data sources may be gathered. The plurality of surface segment data 202a-n may comprise information indicative of surface segment characteristics of a single object or area or may comprise information indicative of surface segment characteristics of a plurality of objects and/or areas and/or types of objects and/or areas. First surface segment data 202a may, for example, be descriptive of roadway geometry and/or accident data—e.g., from a third-party data source such as the Insurance Institute for Highway Safety (IIHS), and/or may comprise federal, state, regional, town/local, and/or municipal data reports, such as police reports, fire department reports, Department of Transportation (DOT) reports, and/or Department of Motor Vehicle (DMV) reports, providing accident and/or surface segment characteristic data at various locations. Other surface segment data 202n may comprise, in some embodiments, public news, records, and/or weather feeds and/or databases regarding accidents, surface segment characteristics, and/or other data at various locations, such as weather conditions at such locations. In some embodiments, the first surface segment data 202a may comprise other private, public, or volunteer data reports, such as hospital reports, ambulance/EMT data, tow truck data, American Automobile Association (AAA) data, National Highway Transportation Administration (NHTSA) data, and the like (e.g., providing accident, surface segment characteristics, and/or other data at various locations).

In some embodiments, the surface segment data 202a-n may be descriptive of roadway geometry data for all roadways (or roadways of a particular classification) in a particular geographic region. In some embodiments, the surface segment data 202a-n may be descriptive of an average number of accidents and/or injuries per hour for roadways sharing particular characteristics, such as lighting characteristics, pavement type characteristics, slope, pitch, and/or width characteristics, and/or weather characteristics (e.g., high winds—such as average sustained winds over a particular threshold value such as ten miles per hour (10 mph) and/or poor drainage (e.g., a number or reported "ponding" occurrences over a pre-determined threshold).

According to some embodiments, the method 200 may also or alternatively comprise one or more actions associated with surface segment processing 210. As depicted in FIG. 2, for example, some or all of the surface segment data 202a-n may be determined, gathered, transmitted and/or received, and/or otherwise obtained for surface segment processing 210. In some embodiments, surface segment processing 210 may comprise aggregation, analysis, calculation, filtering, conversion, encoding and/or decoding (including encrypting and/or decrypting), sorting, ranking, de-duping, and/or any combinations thereof.

According to some embodiments, a processing device may execute specially programmed instructions to process (e.g., the surface segment processing 210) the surface segment data 202a-n to define a surface segment metric and/or index. Such a surface segment metric may, for example, be descriptive (in a qualitative and/or quantitative manner) of historic, current, and/or predicted risk levels of an object and/or area having and/or being associated with one or more surface segment characteristics. In some embodiments, the surface segment metric may be time-dependent (e.g., a level of risk of a highway with a downgrade of greater than ten percent (>10%) may be determined based on any given time of day), time- or frequency-based (e.g., accidents per hour), and/or an average, mean, and/or other statistically normalized value (e.g., an index).

According to some embodiments, there may be a correlation between the risk level associated with a particular surface segment characteristics (and/or set of characteristics) and weather events when determining risk of loss. For example, a given risk level for a surface segment characteristic may correlate to a higher risk when there is ice, snow, or rain likely to occur, than when it is dry.

In some embodiments, the method 200 may also or alternatively comprise one or more actions associated with insurance underwriting 220. Insurance underwriting 220 may generally comprise any type, variety, and/or configuration of underwriting process and/or functionality that is or becomes known or practicable. Insurance underwriting 220 may comprise, for example, simply consulting a pre-existing rule, criteria, and/or threshold to determine if an insurance product may be offered, underwritten, and/or issued to clients, based on any relevant surface segment data 202*a-n*. One example of an insurance underwriting 220 process may comprise one or more of a risk assessment 230 and/or a premium calculation 240 (e.g., as shown in FIG. 2). In some embodiments, while both the risk assessment 230 and the premium calculation 240 are depicted as being part of an exemplary insurance underwriting 220 procedure, either or both of the risk assessment 230 and the premium calculation 240 may alternatively be part of a different process and/or different type of process (and/or may not be included in the method 200, as is or becomes practicable and/or desirable). In some embodiments, the surface segment data 202*a-n* may be utilized in the insurance underwriting 220 and/or portions or processes thereof (the surface segment data 202*a-n* may be utilized, at least in part for example, to determine, define, identify, recommend, and/or select a coverage type and/or limit and/or type and/or configuration of underwriting product).

In some embodiments, the surface segment data 202*a-n* and/or a result of the surface segment processing 210 may be determined and utilized to conduct risk assessment 230 for any of a variety of purposes. In some embodiments, the risk assessment 230 may be conducted as part of a rating process for determining how to structure an insurance product and/or offering. A "rating engine" utilized in an insurance underwriting process may, for example, retrieve a surface segment metric (e.g., provided as a result of the surface segment processing 210) for input into a calculation (and/or series of calculations and/or a mathematical model) to determine a level of risk or the amount of risky behavior likely to be associated with a particular object and/or area (e.g., being associated with one or more particular surface segment characteristics). In some embodiments, how often a client/customer travels on a particular type of surface segment may correspond to a high risk metric associated with that client/customer. In some embodiments, the risk assessment 230 may comprise determining that a client views and/or utilizes surface segment information (e.g., made available to the client via the insurance company and/or a third-party). In some embodiments, the risk assessment 230 (and/or the method 200) may comprise providing coaching, route guidance, and/or other risk control recommendations (e.g., recommendations and/or suggestions directed to reduction of risk, premiums, loss, etc.).

According to some embodiments, the method 200 may also or alternatively comprise one or more actions associated with premium calculation 240 (e.g., which may be part of the insurance underwriting 220). In the case that the method 200 comprises the insurance underwriting 220 process, for example, the premium calculation 240 may be utilized by a "pricing engine" to calculate (and/or look-up or otherwise determine) an appropriate premium to charge for an insurance policy associated with the object and/or area for which the surface segment data 202*a-n* was collected and for which the risk assessment 230 was performed. In some embodiments, the object and/or area analyzed may comprise an object and/or area for which an insurance product is sought (e.g., the analyzed object may comprise an automobile for which an automobile insurance policy is desired or a business for which business insurance is desired). According to some embodiments, the object and/or area analyzed may be an object and/or area other than the object and/or area for which insurance is sought (e.g., the analyzed object and/or area may comprise a tunnel through which the automobile for which the automobile insurance policy is desired is often driven or a road which has had a high number of accidents over the past twelve (12) months, or other desired period).

According to some embodiments, the method 200 may also or alternatively comprise one or more actions associated with insurance policy quote and/or issuance 250. Once a policy has been rated, priced, or quoted and the client has accepted the coverage terms, the insurance company may, for example, bind and issue the policy by hard copy and/or electronically to the client/insured. In some embodiments, the quoted and/or issued policy may comprise a personal insurance policy, such as a personal automobile and/or liability policy, and/or a business insurance policy, such as a business liability policy, a fleet insurance policy, a cargo and/or goods insurance policy, and/or a workers' compensation and/or directors and officers insurance policy.

In general, a client/customer may visit a website and/or an insurance agent, for example, provide the needed information about the client and type of desired insurance, and request an insurance policy and/or product. According to some embodiments, the insurance underwriting 220 may be performed utilizing information about the potential client and the policy may be issued as a result thereof. Insurance coverage may, for example, be evaluated, rated, priced, and/or sold to one or more clients, at least in part, based on the surface segment data 202*a-n*. In some embodiments, an insurance company may have the potential client indicate electronically, on-line, or otherwise whether they have any surface segment and/or location-sensing (e.g., telematics) devices (and/or which specific devices they have) and/or whether they are willing to install them or have them installed. In some embodiments, this may be done by check boxes, radio buttons, or other form of data input/selection, on a web page and/or via a mobile device application.

In some embodiments, the method 200 may comprise telematics data gathering, at 252. In the case that a client desires to have telematics data monitored, recorded, and/or analyzed, for example, not only may such a desire or willingness affect policy pricing (e.g., affect the premium calculation 240), but such a desire or willingness may also cause, trigger, and/or facilitate the transmitting and/or receiving, gathering, retrieving, and/or other obtaining of surface segment data 202*a-n* from one or more telematics devices. As depicted in FIG. 2, results of the telematics data gathering at 252 may be utilized to affect the surface segment processing 210, the risk assessment 230, and/or the premium calculation 240 (and/or otherwise may affect the insurance underwriting 220).

According to some embodiments, the method 200 may also or alternatively comprise one or more actions associated with claims 260. In the insurance context, for example, after an insurance product is provided and/or policy is issued (e.g., via the insurance policy quote and issuance 250), and/or during or after telematics data gathering 252, one or more insurance claims 260 may be filed against the product/policy. In some embodiments, such as in the case that a first object associated with the insurance policy is somehow involved with one or more insurance claims 260, first surface segment data 202*a* of the object or related objects may be gathered and/or otherwise obtained. According to some embodiments, such surface segment data 202*a-n* may comprise data indicative of a level of risk of the object and/or area (or area in which the object was located) at the time of casualty or loss (e.g., as defined by the one or more claims 260). Information on claims 260 may be provided to the surface segment processing 210, risk assessment 230, and/or premium calculation 240 to update, improve, and/or enhance these procedures and/or associated software and/or devices. In some embodiments, surface segment data 202a-n may be utilized to determine, inform, define, and/or facilitate a determination or allocation of responsibility and/or blame related to a loss (e.g., the surface segment data 202a-n may be utilized to determine an allocation of weighted liability amongst those involved in the incident(s) associated with the loss).

In some embodiments, the method 200 may also or alternatively comprise insurance policy renewal review 270. Surface segment data 202a-n may be utilized, for example, to determine if and/or how an existing insurance policy (e.g., provided via the insurance policy quote and issuance 250) may be renewed. According to some embodiments, such as in the case that a client is involved with and/or in charge of (e.g., responsible for) providing the surface segment data 202a-n (e.g., such as location data indicative of one or more particular surface segments), a review may be conducted to determine if the correct amount, frequency, and/or type or quality of the surface segment data 202a-n was indeed provided by the client during the original term of the policy. In the case that the surface segment data 202a-n was lacking, the policy may not, for example, be renewed and/or any discount received by the client for providing the surface segment data 202a-n may be revoked or reduced. In some embodiments, the client may be offered a discount for having certain surface segment sensing devices or being willing to install them or have them installed (or be willing to adhere to certain thresholds based on measurements from such devices). In some embodiments, analysis of the received surface segment data 202a-n in association with the policy may be utilized to determine if the client conformed to various criteria and/or rules set forth in the original policy. In the case that the client satisfied applicable policy requirements (e.g., as verified by received surface segment data 202a-n), the policy may be eligible for renewal and/or discounts. In the case that deviations from policy requirements are determined (e.g., based on the surface segment data 202a-n), the policy may not be eligible for renewal, a different policy may be applicable, and/or one or more surcharges and/or other penalties may be applied.

According to some embodiments, the method 200 may comprise one or more actions associated with risk/loss control 280. Any or all data (e.g., surface segment data 202a-n and/or other data) gathered as part of a process for claims 260, for example, may be gathered, collected, and/or analyzed to determine how (if at all) one or more of a rating engine (e.g., the risk assessment 230), a pricing engine (e.g., the premium calculation 240), the insurance underwriting 220, and/or the surface segment processing 210, should be updated to reflect actual and/or realized risk, costs, and/or other issues associated with the surface segment data 202a-n. Results of the risk/loss control 280 may, according to some embodiments, be fed back into the method 200 to refine the risk assessment 230, the premium calculation 240 (e.g., for subsequent insurance queries and/or calculations), the insurance policy renewal review 270 (e.g., a re-calculation of an existing policy for which the one or more claims 260 were filed), and/or the surface segment processing 210 to appropriately scale the output of the risk assessment 230.

Figure 3:
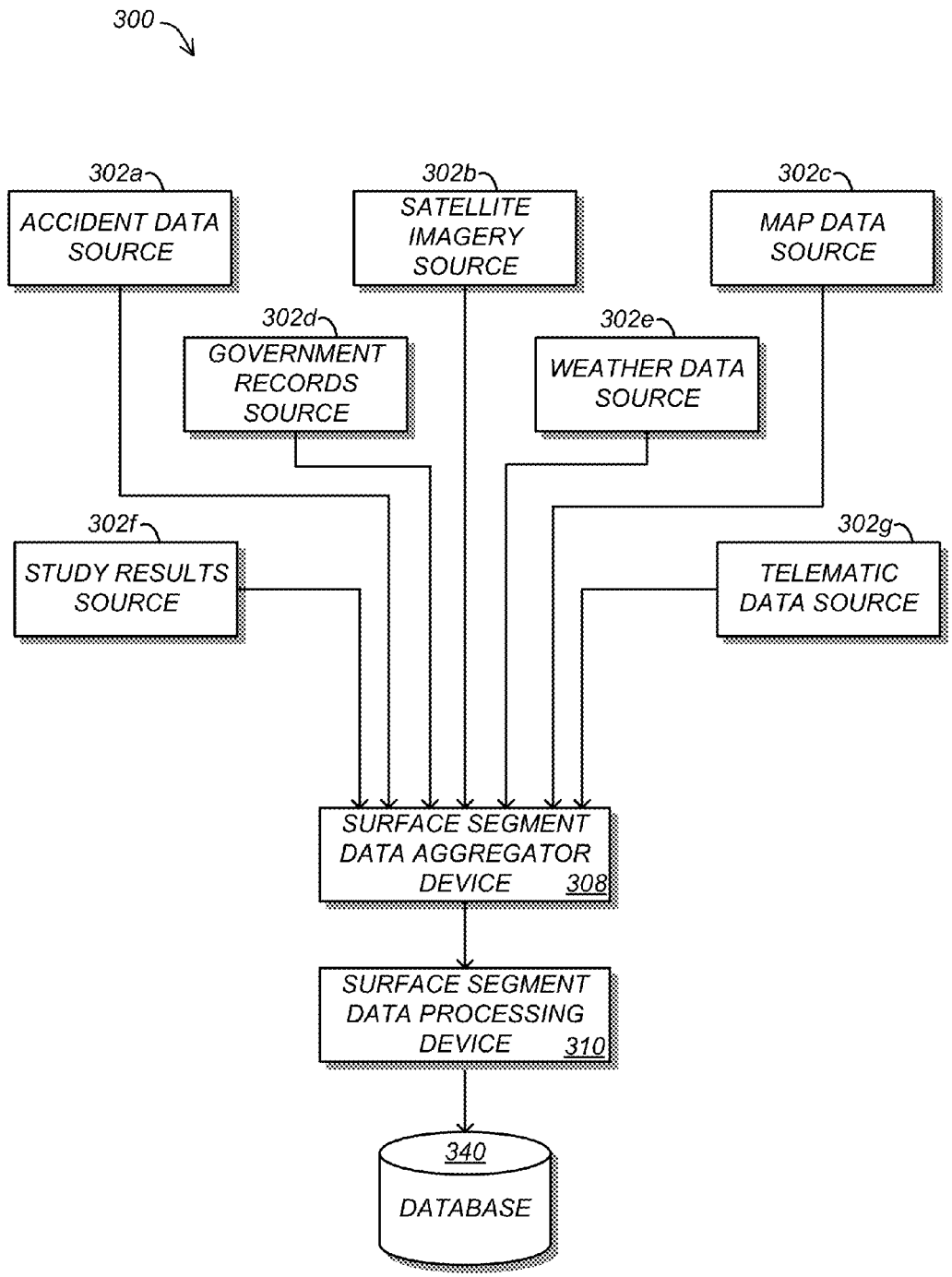
FIG. 3 is a block diagram of a system according to some embodiments.

Turning now to FIG. 3, a block diagram of a system 300 according to some embodiments is shown. In some embodiments, the system 300 may comprise one or more surface segment data sources 302a-g, a surface segment data aggregator device 308, a surface segment data processing device 310, and/or a database 340. According to some embodiments, any or all of the components 302a-g, 308, 310, 340 of the system 300 may be similar in configuration, quantity, and/or functionality to any similarly named and/or numbered components described herein. Fewer or more components 302a-g, 308, 310, 340 and/or various configurations of the components 302a-g, 308, 310, 340 may be included in the system 300 without deviating from the scope of embodiments described herein. While multiples of some components 302a-g are depicted and while single instances of other components 308, 310, 340 are depicted, for example, any component 302a-g, 308, 310, 340 depicted in the system 300 may be removed from the system 300, may comprise a single device, a combination of devices and/or components 302a-g, 308, 310, 340, and/or a plurality of devices, as is or becomes desirable and/or practicable.

According to some embodiments, the system 300 may be configured to gather, aggregate, and/or process surface segment data (e.g., the surface segment data 202a-n of FIG. 2 herein) for a plurality of objects and/or areas. While any type of desired object and/or area may be monitored and/or analyzed to determine risk data and/or indicators thereof, such objects and/or areas may generally fall into one or more categories and/or classes. Such categories may include, but are not limited to, for example, a transportation category containing a transportation object and/or area and/or a location category containing a location object and/or area.

As described herein, a transportation object and/or area may generally comprise one or more transportation pathways such as sidewalks, paths, streets, highways, canals, seaways and/or shipping lanes, railroads, etc. A location object and/or area may generally comprise one or more physical locations such as buildings, street corners, intersections, railroad crossings, stores, shops, malls, entertainment facilities (e.g., sports tracks, casinos, and/or theatres), bridges, tunnels, etc.

In some embodiments, the surface segment data sources 302a-g may be in communication with and/or otherwise coupled to receive data descriptive of the objects and/or areas. The surface segment data sources 302a-g may be utilized, for example, to sense (e.g., in the case of a surface segment data device such as a sensor and/or telematics device), monitor, retrieve (e.g., such as by scanning and/or copying), store, sort, rank, and/or otherwise organize and/or process data descriptive of the objects and/or areas. The data gathered may generally comprise data that is indicative of some measure of surface-related risk of one or more of the objects and/or areas (and/or that is descriptive of one or more of the objects and/or areas but is indicative of the risk level of another object and/or area). In some embodiments, one or more of the surface segment data sources 302a-g may conduct pre-processing of the gathered data. Analog data may converted to digital form, for example, data may be grouped, sorted, and/or cleansed (e.g., duplicate data and/or outliers may be removed), compressed, and/or encoded or encrypted data (such as from a "secure" sensor and/or data storage system) may be decoded or decrypted. Similarly, raw data gathered from one or more of the objects and/or areas may be encoded and/or encrypted by a surface segment data sources 302a-g (e.g., prior to transmitting and/or otherwise providing the information to the surface segment data aggregator device 308).

In some embodiments, surface segment data may be obtained from a vendor and/or third-party, such as an engineering firm, a surveying firm, a town and/or other municipal records office, a university, a police department, a fire department, an emergency response unit, a roadside assistance organization, a hospital, a doctor, an insurance company, a DOT, a Department of Natural Resources (DNR), a Department of Homeland Security (DHS), and/or a DMV. Data may also or alternatively be provided by other vendors and/or state and federal agencies.

In some embodiments, the surface segment data sources 302a-g may comprise an accident data source 302a, a satellite imagery source 302b, a map data source 302c, a government records source 302d, a weather data source 302e, a study results source 302f, and/or a telematic data source 302g. The accident data source 302a may comprise, for example, an accident avoidance and/or detection device (e.g., an airbag sensor and/or a vehicle comprising such a sensor), a police log and/or accident report, a photo and/or video feed or file (e.g., providing image and/or sound information of an accident—such as a traffic camera and/or in-car or dash-cam), and/or an accident reconstruction report. In some embodiments, the satellite imagery source 302b may comprise a satellite and/or aerial camera, a private third-party device and/or source such as Google® Maps and/or Google® Earth satellite and/or aerial imagery and/or associated applications and/or servers, Terraserver® satellite and/or aerial imagery and/or associated applications and/or servers available from Terraserver® of Raleigh, N.C., and/or a governmental source such as the National Oceanic and Atmospheric Association (NOAA), and/or the United States Geological Survey (USGS). In some embodiments, the map data source 302c may comprise a mapping and/or location device such as a Global Positioning System (GPS) device, telematics device, navigational device, radio and/or cellular frequency communication device (e.g., for triangulation of position), survey equipment, and/or a private and/or governmental map data source such as Google® Maps, the Rand McNally company of Skokie, Ill., and/or the USGS. In some embodiments, the government records source 302d may comprise physical and/or electronic archives such as are available via the Library of Congress, town hall records (e.g., real estate sales and/or building blueprints or schematics), and/or DOT roadway designs. In some embodiments, the weather data source 302e may comprise a weather instrument (such as a barometer, rain gauge, and/or thermometer), private and/or governmental weather records, a stream gauge, and/or a data logger device. In some embodiments, the study results source 302f may comprise an academic study such as a roadway design and/or analysis paper, and/or an insurance and/or risk or loss study (such as may be conducted by the National Highway Traffic Safety Administration (NHTSA). In some embodiments, the telematic data source 302g may comprise an on-board vehicle diagnostics device such as an accelerometer, Tire Pressure Monitoring system (TPMS), speedometer, voltage gauge, Revolutions-Per-Minute (RPM) gauge, and/or locational device, whether from and/or associated with an Original Equipment Manufacturer (OEM) or an after-market source.

Figure 4:
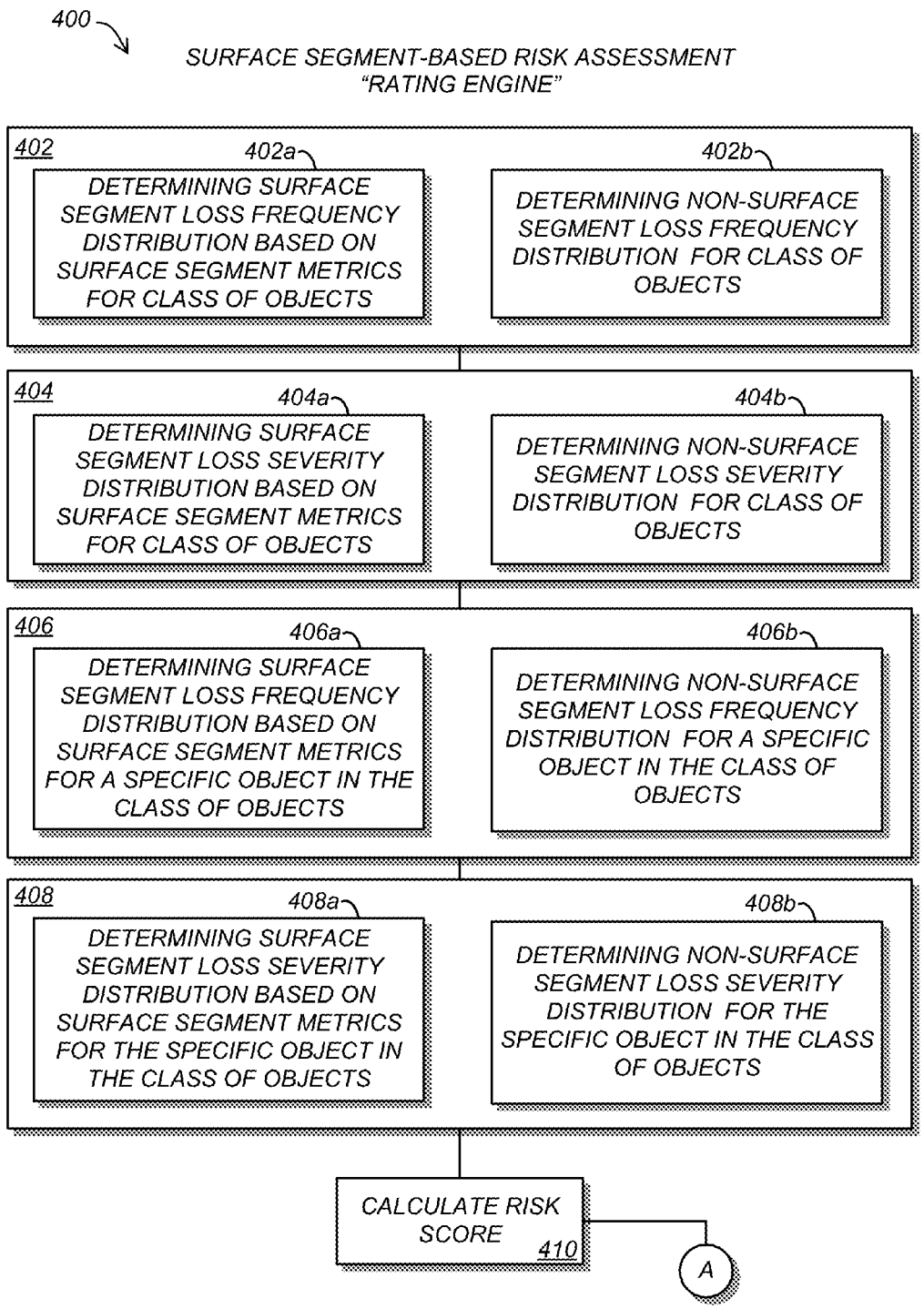
FIG. 4 is a flow diagram of a method according to some embodiments.
Figure 5:
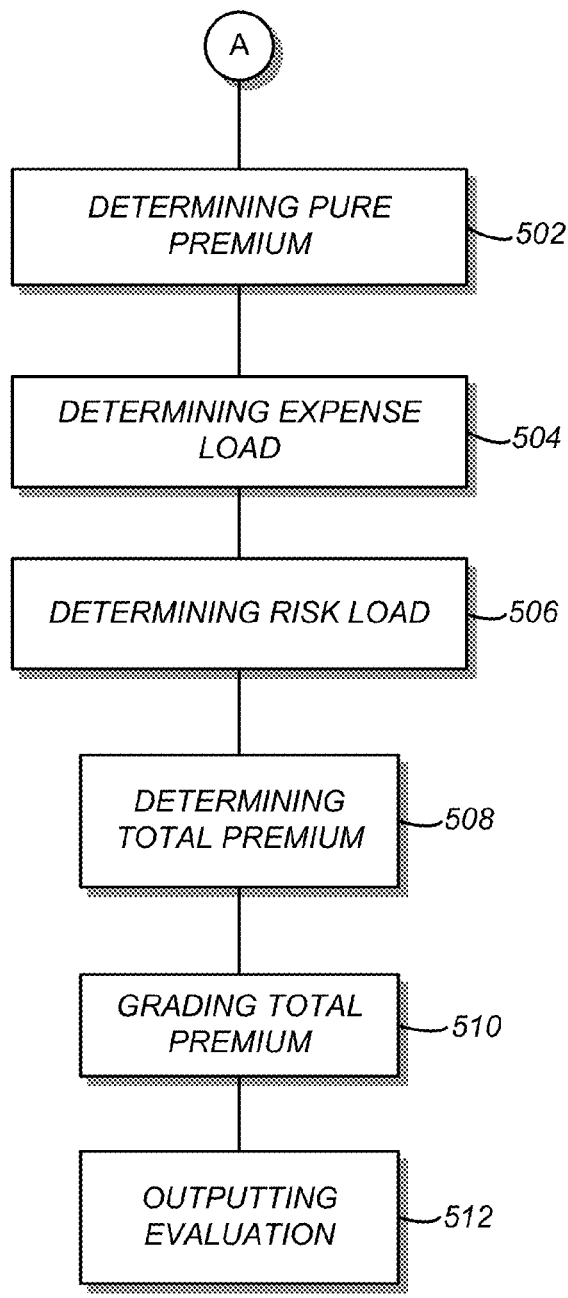
FIG. 5 is a flow diagram of a method according to some embodiments.
Figure 7:
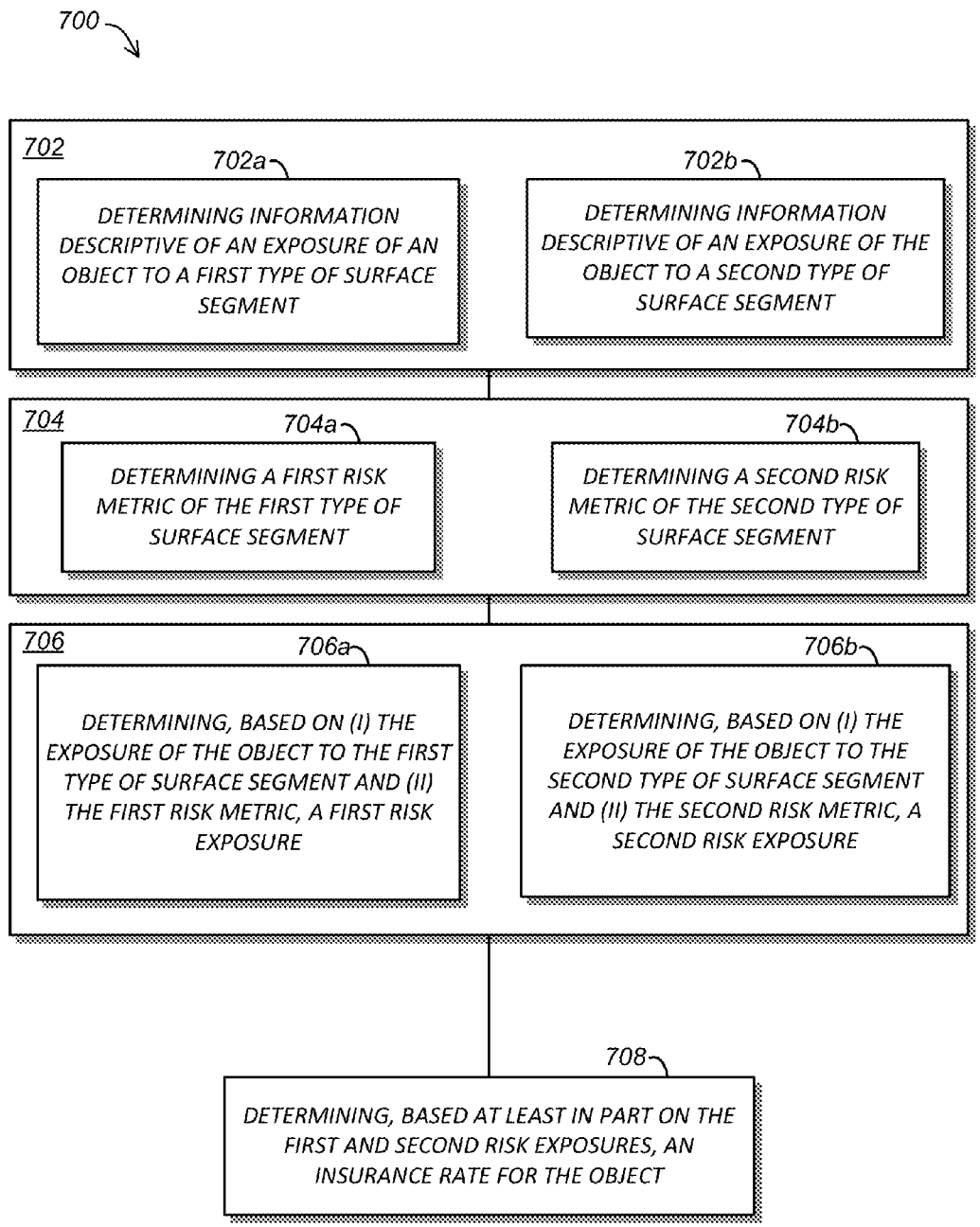
FIG. 7 is a flow diagram of a method according to some embodiments.

According to some embodiments, the surface segment data aggregator device 308 may gather, retrieve, sort, rank, store, and/or otherwise organize and/or obtain surface segment data from one or more of the surface segment data sources 302a-g (such as by executing the methods 200, 400, 500, 700 described in conjunction with FIG. 2, FIG. 4, FIG. 5, and/or FIG. 7 herein, or any portions, steps, and/or procedures thereof). The surface segment data aggregator device 308 may further filter and/or cleanse the data to eliminate duplicate data received from the various surface segment data sources 302a-g. In some embodiments, the surface segment data aggregator device 308 may comprise a "bot" and/or may store a program that seeks and retrieves surface segment data from various sources (such as from the surface segment data sources 302a-g and/or from a third party-device or system (not explicitly shown in FIG. 3) such as a police log or a Comprehensive Loss Underwriting Exchange (CLUE) database). In one embodiment, such as in the case where each of the surface segment data sources 302a-g comprises a webcam, for example, the surface segment data aggregator device 308 may comprise a camera hub, Digital Video Recorder (DVR), and/or PC configured to receive data from each of a plurality of webcams. In some embodiments, the surface segment data aggregator device 308 may also or alternatively perform other functions, such as data load management, power distribution (e.g., providing electrical power to the plurality of surface segment data sources 302a-g, such as by functioning as Power Sourcing Equipment (PSE) in accordance with the Power over Ethernet (PoE) transmission standard 802.3at® published by the IEEE, Sep. 1, 2009). In some embodiments, the surface segment data aggregator device 308 may provide aggregated surface segment data to the surface segment data processing device 310.

The surface segment data processing device 310 may, for example, comprise one or more CPU devices and/or other logic components (e.g., a computerized and/or electronic processor) coupled to receive aggregated surface segment data from the surface segment data aggregator device 308. As described herein, the surface segment data processing device 310 may perform various processing functions (such as the methods 200, 400, 500, 700 described in conjunction with FIG. 2, FIG. 4, FIG. 5, and/or FIG. 7 herein, or any portions, steps, and/or procedures thereof) on the aggregated surface segment data, including computation of a surface segment risk model. The results of such processing may, according to some embodiments, comprise definition of one or more surface segment metrics, such as surface segment ranks, scores, tiers, and/or indices associated with the surface segment risk model. In some embodiments, the surface segment data processing device 310 may also or alternatively store (and/or access) the aggregated surface segment data.

The surface segment data processing device 310 may, for example, communicate with, be coupled to, and/or comprise the database 340. The database 340 may, in accordance with some embodiments, store raw, pre-processed, aggregated, summarized, and/or historical surface segment data descriptive of the surface-related risk of any desired objects and/or areas. The surface segment data processing device 310 and/or the database 340 may also or alternatively store one or more qualitative and/or quantitative surface segment scores, ranks, tiers, and/or indices associated with the objects and/or areas. In some embodiments, the surface segment data processing device 310 may also or alternatively perform other functionality, such as facilitating risk assessment and/or premium determinations (e.g., the surface segment data processing device 310 may comprise one or more computers operating a specialized program and/or instructions that utilize surface segment data to assess risk and calculate premiums for insurance policies—e.g., the insurance underwriting 220 of FIG. 2).

Surface segment data and/or surface segment levels or indices may also or alternatively be determined for multiple portions and/or parts of a given object and/or area. With respect to a particular roadway comprising a plurality of surface segments, for example, each such surface segment may have (and/or be associated with) a different respective surface segment risk level and/or rating. In such a case, the overall surface-related risk rating/level for the roadway at any given time may be a combination of each of the sub-risk levels of the object/area (e.g., some mathematical expression combining each of the risk levels of the various surface segments of the roadway). In some embodiments, there may be multiple and/or sub-risk levels or indices that are calculated and provided for different areas and/or parts of a given object/area, e.g., On-ramp=High, 4-lane Straight segment=Low, 6-lane curved concrete when wet=Med. These sub-levels may be utilized, for example, to predict how risk levels change from one surface segment of an object to another (e.g., due to changing conditions). For example, if the on-ramps of a highway have a "high" risk level but the exit ramps have a "low" risk level (e.g., at any particular point and/or range in time), it may be possible to predict when and/or to what extent the risk level of the exit ramps (or particular exit ramps) may increase. Similarly, if the on-ramp risk level is "high", the travel lanes of the highway may experience "high" risk levels soon (such as in the case that risk is influenced by a level of busyness, as described in commonly assigned, co-pending U.S. patent application Ser. No. 12/978,535 filed on Dec. 24, 2010, in the name of Collins and titled "RISK ASSESSMENT AND CONTROL, INSURANCE PREMIUM DETERMINATIONS, AND OTHER APPLICATIONS USING BUSYNESS", the busyness concepts of which are hereby incorporated by reference herein). Such processing and/or predictive modeling may be performed, for example, by the surface segment data aggregator device 308 and/or the surface segment data processing device 310.

Although the surface segment data sources 302a-g, the surface segment data aggregator device 308, and the surface segment data processing device 310 are depicted as separate devices in FIG. 3, in some embodiments, any or all of the components 302a-g, 308, 310 of the system 300 (such as the surface segment data sources 302a-g, the surface segment data aggregator device 308, and the surface segment data processing device 310) may be embodied in a single device, apparatus, and/or interconnected system. A single entity (such as an insurance company) may own and/or operate devices configured and/or coupled to function as any or all of the components 302a-g, 308, 310 of the system 300, for example, or a single computer and/or computer server or system may perform any or all of such functions. In some embodiments, surface segment data sources 302a-g may also or alternatively collect, gather, store, and/or provide other types of data.

In some embodiments, data indicative of surface segment risk and/or surface segment risk metrics and/or indices may be output and/or provided in various advantageous forms. Data may be provided utilizing graphs, charts, tables, maps, and/or other visual and/or tabular forms of output as is or becomes desirable or practicable. According to some embodiments, such output may be provided via mobile devices (e.g., operated by clients and/or field agents) such as smart phones, PDA devices, tablet computers (e.g., the Apple® iPad™), etc., and/or via one or more other GUI interfaces such as via a website and/or kiosk.

Turning now to FIG. 4, a flow diagram of a method 400 according to some embodiments is shown. In some embodiments, the method 400 may comprise a surface segment risk assessment method which may, for example, be described as a "rating engine". According to some embodiments, the method 400 may be implemented, facilitated, and/or performed by or otherwise associated with any of the systems 100, 300, 900 of FIG. 1, FIG. 3, and/or FIG. 9 herein. In some embodiments, the method 400 may be associated with the method 200 of FIG. 2. The method 400 may, for example, comprise a portion of the method 200 such as the risk assessment 230.

According to some embodiments, the method 400 may comprise determining one or more loss frequency distributions for a class of objects, at 402 (e.g., 402a-b). In some embodiments, a first loss frequency distribution may be determined, at 402a, based on surface segment data and/or metrics. Surface segment data (such as the surface segment data 202a-n of FIG. 2) for a class of objects such as a class of roadway and/or for a particular type of object (such as an at-grade railway crossing) within a class of objects (such as "intersections") may, for example, be analyzed to determine relationships between various surface segment data and/or metrics and empirical data descriptive of actual insurance losses for such object types and/or classes of objects. A surface segment processing and/or analytics system and/or device (e.g., the controller device 110 and/or the surface segment data processing device 310 as described with respect to FIG. 1 and/or FIG. 3 herein, respectively) may, according to some embodiments, conduct regression and/or other mathematical analysis on various busyness metrics to determine and/or identify mathematical relationships that may exist between such metrics and actual sustained losses and/or casualties.

Similarly, at 402b, a second loss frequency distribution may be determined based on non-surface segment data. According to some embodiments, the determining at 402b may comprise a standard or typical loss frequency distribution utilized by an entity (such as an insurance company) to assess risk. The non-surface segment metrics utilized as inputs in the determining at 402b may include, for example, age of a building or car, driving record of an individual, a criminal record of an individual, color of a vehicle, etc. In some embodiments, the loss frequency distribution determinations at 402a-b may be combined and/or determined as part of a single comprehensive loss frequency distribution determination. In such a manner, for example, expected total loss probabilities (e.g., taking into account both surface segment and non-surface segment data) for a particular object type and/or class may be determined. In some embodiments, this may establish and/or define a baseline, datum, average, and/or standard with which individual and/or particular risk assessments may be measured.

According to some embodiments, the method 400 may comprise determining one or more loss severity distributions for a class of objects, at 404 (e.g., 404a-b). In some embodiments, a first loss severity distribution may be determined, at 404a, based on surface segment data and/or metrics. Surface segment data (such as the surface segment data 202a-n of FIG. 2) for a class of objects such as location objects and/or for a particular type of object (such as a drycleaner) may, for example, be analyzed to determine relationships between various surface segment data and/or metrics and empirical data descriptive of actual insurance losses for such object types and/or classes of objects. A surface segment processing and/or analytics system (e.g., the controller device 110 and/or the surface segment data processing device 310 as described with respect to FIG. 1 and/or FIG. 3 herein, respectively) may, according to some embodiments, conduct regression and/or other analysis on various (e.g., busyness) metrics to determine and/or identify mathematical relationships that may exist between such metrics and actual sustained losses and/or casualties.

Similarly, at 404b, a second loss severity distribution may be determined based on non-surface segment data. According to some embodiments, the determining at 404b may comprise a standard or typical loss severity distribution utilized by an entity (such as an insurance agency) to assess risk. The non-surface segment metrics utilized as inputs in the determining at 404*b* may include, for example, cost of replacement or repair, ability to self-mitigate loss (e.g., if a building has a fire suppression system and/or automatically closing fire doors), etc. In some embodiments, the loss severity distribution determinations at 404*a-b* may be combined and/or determined as part of a single comprehensive loss severity distribution determination. In such a manner, for example, expected total loss severities (e.g., taking into account both surface segment and non-surface segment data) for a particular object type and/or class may be determined. In some embodiments, this may also or alternatively establish and/or define a baseline, datum, average, and/or standard with which individual and/or particular risk assessments may be measured.

In some embodiments, the method 400 may comprise determining one or more expected loss frequency distributions for a specific object in the class of objects, at 406 (e.g., 406*a-b*). Regression and/or other mathematical analysis performed on the surface segment loss frequency distribution derived from empirical data, at 402*a* for example, may identify various surface segment metrics and may mathematically relate such metrics to expected loss occurrences (e.g., based on historical trends). Based on these relationships, a surface segment loss frequency distribution may be developed at 406*a* for the specific object. In such a manner, for example, known surface segment metrics for a specific object may be utilized to develop an expected distribution (e.g., probability) of occurrence of surface segment-related loss for the specific object.

Similarly, regression and/or other mathematical analysis performed on the non-surface segment loss frequency distribution derived from empirical data, at 402*b* for example, may identify various non-surface segment metrics and may mathematically relate such metrics to expected loss occurrences (e.g., based on historical trends). Based on these relationships, a non-surface segment loss frequency distribution may be developed at 406*b* for the specific object. In such a manner, for example, known non-surface segment metrics for a specific object may be utilized to develop an expected distribution (e.g., probability) of occurrence of non-surface segment-related loss for the specific object. In some embodiments, the non-surface segment loss frequency distribution determined at 406*b* may be similar to a standard or typical loss frequency distribution utilized by an insurer to assess risk.

In some embodiments, the method 400 may comprise determining one or more expected loss severity distributions for a specific object in the class of objects, at 408 (e.g., 408*a-b*). Regression and/or other mathematical analysis performed on the surface segment loss severity distribution derived from empirical data, at 404*a* for example, may identify various surface segment metrics and may mathematically relate such metrics to expected loss severities (e.g., based on historical trends). Based on these relationships, a surface segment loss severity distribution may be developed at 408*a* for the specific object. In such a manner, for example, known surface segment metrics for a specific object may be utilized to develop an expected severity for occurrences of surface segment-related loss for the specific object.

Similarly, regression and/or other mathematical analysis performed on the non-surface segment loss severity distribution derived from empirical data, at 404*b* for example, may identify various non-surface segment metrics and may mathematically relate such metrics to expected loss severities (e.g., based on historical trends). Based on these relationships, a non-surface segment loss severity distribution may be developed at 408*b* for the specific object. In such a manner, for example, known non-surface segment metrics for a specific object may be utilized to develop an expected severity of occurrences of non-surface segment-related loss for the specific object. In some embodiments, the non-surface segment loss severity distribution determined at 408*b* may be similar to a standard or typical loss frequency distribution utilized by an insurer to assess risk.

It should also be understood that the surface segment-based determinations 402*a*, 404*a*, 406*a*, 408*a* and non-surface segment-based determinations 402*b*, 404*b*, 406*b*, 408*b* are separately depicted in FIG. 4 for ease of illustration of one embodiment descriptive of how surface segment metrics may be included to enhance standard risk assessment procedures. According to some embodiments, the surface segment-based determinations 402*a*, 404*a*, 406*a*, 408*a* and non-surface segment-based determinations 402*b*, 404*b*, 406*b*, 408*b* may indeed be performed separately and/or distinctly in either time or space (e.g., they may be determined by different software and/or hardware modules or components and/or may be performed serially with respect to time). In some embodiments, the surface segment-based determinations 402*a*, 404*a*, 406*a*, 408*a* and non-surface segment-based determinations 402*b*, 404*b*, 406*b*, 408*b* may be incorporated into a single risk assessment process or "engine" that may, for example, comprise a risk assessment software program, package, and/or module.

In some embodiments, the method 400 may also comprise calculating a risk score (e.g., for an object), at 410. According to some embodiments, formulas, charts, and/or tables may be developed that associate various surface segment and/or non-surface segment metric magnitudes with risk scores. Higher levels of turn curvature on a high-speed highway that may be described by a "steep curve" surface segment metric, for example, may equate to a risk score of two (2), while high populations of large wildlife (e.g., deer or moose) adjacent to a highway (e.g., that does not have a wildlife fence) that may be described by a wildlife risk surface segment metric may equate to a risk score of ten (10). Risk scores for a plurality of surface segment and/or non-surface segment metrics may be determined, calculated, tabulated, and/or summed to arrive at a total risk score for an object (e.g., a fleet of vehicles, various individuals and/or groups thereof) and/or for an object class. According to some embodiments, risk scores may be derived from the surface segment and/or non-surface segment loss frequency distributions and the surface segment and/or non-surface segment loss severity distribution determined at 406*a-b* and 408*a-b*, respectively. More details on one method for assessing risk are provided in commonly-assigned U.S. Pat. No. 7,330,820 entitled "PREMIUM EVALUATION SYSTEMS AND METHODS," which issued on Feb. 12, 2008, the risk assessment concepts and descriptions of which are hereby incorporated by reference herein.

In some embodiments, the method 400 may also or alternatively comprise providing various coaching, route recommendations, and/or other suggestions, guidelines, and/or rules directed to reducing and/or minimizing risk, premiums, etc. According to some embodiments, the results of the method 400 may be utilized to determine a premium for an insurance policy for, e.g., a specific object analyzed. Any or all of the surface segment and/or non-surface segment loss frequency distributions of 406*a-b*, the surface segment and/or non-surface segment loss severity distributions of 408*a-b*, and the risk score of 410 may, for example, be passed to and/or otherwise utilized by a premium calculation process via the node labeled "A" in FIG. 4.

Referring to FIG. 5, for example, a flow diagram of a method 500 (that may initiate at the node labeled "A") according to some embodiments is shown. In some embodiments, the method 500 may comprise a surface segment-based premium determination method which may, for example, be described as a "pricing engine". According to some embodiments, the method 500 may be implemented, facilitated, and/or performed by or otherwise associated with any of the systems 100, 300, 900 of FIG. 1, FIG. 3, and/or FIG. 9 herein. In some embodiments, the method 500 may be associated with the method 200 of FIG. 2. The method 500 may, for example, comprise a portion of the method 200 such as the premium calculation 240. Any other technique for calculating an insurance premium that uses surface segment information described herein may be utilized, in accordance with some embodiments, as is or becomes practicable and/or desirable.

In some embodiments, the method 500 may comprise determining a pure premium, at 502. A pure premium is a basic, unadjusted premium that is generally calculated based on loss frequency and severity distributions. According to some embodiments, the surface segment and/or non-surface segment loss frequency distributions (e.g., from 406a-b in FIG. 4) and the surface segment and/or non-surface segment loss severity distributions (e.g., from 408a-b in FIG. 4) may be utilized to calculate a pure premium that would be expected, mathematically, to result in no net gain or loss for the insurer when considering only the actual cost of the loss or losses under consideration and their associated loss adjustment expenses. Determination of the pure premium may generally comprise simulation testing and analysis that predicts (e.g., based on the supplied frequency and severity distributions) expected total losses (surface segment-based and/or non-surface segment-based) over time.

According to some embodiments, the method 500 may comprise determining an expense load, at 504. The pure premium determined at 502 does not take into account operational realities experienced by an insurer. The pure premium does not account, for example, for operational expenses such as overhead, staffing, taxes, fees, etc. Thus, in some embodiments, an expense load (or factor) is determined and utilized to take such costs into account when determining an appropriate premium to charge for an insurance product. According to some embodiments, the method 500 may comprise determining a risk load, at 506. The risk load is a factor designed to ensure that the insurer maintains a surplus amount large enough to produce an expected return for an insurance product.

According to some embodiments, the method 500 may comprise determining a total premium, at 508. The total premium may generally be determined and/or calculated by summing or totaling one or more of the pure premium, the expense load, and the risk load. In such a manner, for example, the pure premium is adjusted to compensate for real-world operating considerations that affect an insurer.

According to some embodiments, the method 500 may comprise grading the total premium, at 510. The total premium determined at 508, for example, may be ranked and/or scored by comparing the total premium to one or more benchmarks. In some embodiments, the comparison and/or grading may yield a qualitative measure of the total premium. The total premium may be graded, for example, on a scale of "A", "B", "C", "D", and "F", in order of descending rank. The rating scheme may be simpler or more complex (e.g., similar to the qualitative bond and/or corporate credit rating schemes determined by various credit ratings agencies such as Standard & Poors' (S&P) Financial service LLC, Moody's Investment Service, and/or Fitch Ratings from Fitch, Inc., all of New York, N.Y.) of as is or becomes desirable and/or practicable. More details on one method for calculating and/or grading a premium are provided in commonly-assigned U.S. Pat. No. 7,330,820 entitled "PREMIUM EVALUATION SYSTEMS AND METHODS" which issued on Feb. 12, 2008, the premium calculation and grading concepts and descriptions of which are hereby incorporated by reference herein.

According to some embodiments, the method 500 may comprise outputting an evaluation, at 512. In the case that the results of the determination of the total premium at 508 are not directly and/or automatically utilized for implementation in association with an insurance product, for example, the grading of the premium at 510 and/or other data such as the risk score determined at 410 of FIG. 4 may be utilized to output an indication of the desirability and/or expected profitability of implementing the calculated premium. The outputting of the evaluation may be implemented in any form or manner that is or becomes known or practicable. One or more recommendations, graphical representations, visual aids, comparisons, and/or suggestions may be output, for example, to a device (e.g., a server and/or computer workstation) operated by an insurance underwriter and/or sales agent. One example of an evaluation comprises a creation and output of a risk matrix which may, for example, by developed utilizing Enterprise Risk Register® software which facilitates compliance with ISO 17799/ISO 27000 requirements for risk mitigation and which is available from Northwest Controlling Corporation Ltd. (NOWECO) of London, UK.

Figure 6:
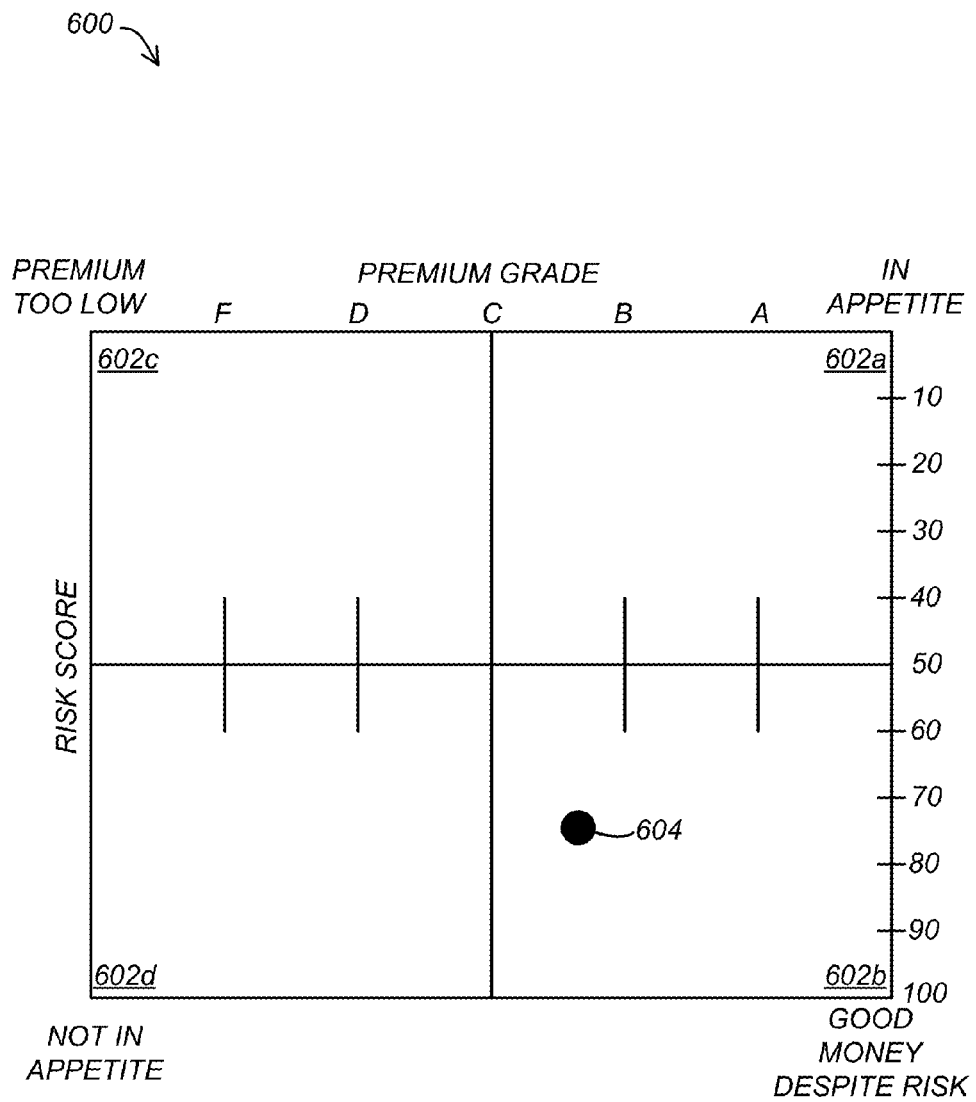
FIG. 6 is a diagram of an exemplary risk matrix according to some embodiments.

Turning to FIG. 6, for example, a diagram of an exemplary risk matrix 600 according to some embodiments is shown. In some embodiments (as depicted), the risk matrix 600 may comprise a simple two-dimensional graph having an X-axis and a Y-axis. Any other type of risk matrix, or no risk matrix, may be used if desired. The detail, complexity, and/or dimensionality of the risk matrix 600 may vary as desired and/or may be tied to a particular insurance product or offering. In some embodiments, the risk matrix 600 may be utilized to visually illustrate a relationship between the risk score (e.g., from 230 of FIG. 2 and/or from 410 of FIG. 4) of an object and the total determined premium (e.g., from 240 of FIGS. 2 and/or 508 of FIG. 5; and/or a grading thereof, such as from 510 of FIG. 5) for an insurance product offered in relation to the object. As shown in FIG. 6, for example, the premium grade may be plotted along the X-axis of the risk matrix 600 and/or the risk score may be plotted along the Y-axis of the risk matrix 600.

In such a manner, the risk matrix 600 may comprise four (4) quadrants 602a-d (e.g., similar to a "four-square" evaluation sheet utilized by automobile dealers to evaluate the propriety of various possible pricing "deals" for new automobiles). The first quadrant 602a represents the most desirable situations where risk scores are low and premiums are highly graded. The second quadrant 602b represents less desirable situations where, while premiums are highly graded, risk scores are higher. Generally, object-specific data that results in data points being plotted in either of the first two quadrants 602a-b is indicative of an object for which an insurance product may be offered on terms likely to be favorable to the insurer. The third quadrant 602c represents less desirable characteristics of having poorly graded premiums with low risk scores and the fourth quadrant 602d represents the least desirable characteristics of having poorly graded premiums as well as high risk scores. Generally, object-specific data that results in data points being plotted in either of the third and fourth quadrants 602*c-d* is indicative of an object for which an insurance product offering is not likely to be favorable to the insurer.

One example of how the risk matrix 600 may be output and/or implemented with respect to surface segments of an object will now be described. Assume, for example, that an automobile policy is desired by a consumer and/or that an automobile insurance policy product is otherwise analyzed to determine whether such a policy would be beneficial for an insurer to issue. Typical risk metrics such as the driving record of the consumer, age of the vehicle, safety features of the vehicle, and/or crash test ratings of the vehicle (consumer safety crash tests and/or damage and/or cost-based crash tests) may be utilized to produce expected loss frequency and loss severity distributions (such as determined at 406*b* and 408*b* of FIG. 4).

In some embodiments, surface segment metrics associated with the vehicle (i.e., the object being insured), such as how often the vehicle is driven on rural roads having travel lanes less than ten feet (10 ft.) in width, may also be utilized to produce expected surface segment loss frequency and surface segment loss severity distributions (such as determined at 406*a* and 408*a* of FIG. 4). According to some embodiments, singular loss frequency and loss severity distributions may be determined utilizing both typical risk metrics, as well as surface segment metrics (of the object being insured and/or of other associated objects).

In the case that the automobile is typically driven through an intersection employing and/or outfitted with a first type and/or brand of traffic control device, the risk score for the vehicle may be determined to be relatively high, such as seventy-five (75) on a scale from zero (0) to one hundred (100), as compared to a score of fifty (50) for a second type and/or brand of traffic control device (e.g., a roadway attribute and/or characteristic). Other non-surface segment factors such as the driving record of the consumer and/or primary driver of the vehicle (and/or other factors) may also contribute to the risk score for the vehicle, consumer, and/or insurance product associated therewith. In some embodiments, if the typical times of day and/or days of the week are known for when the car drives through a specific intersection, this can be correlated with historical and/or predicted surface segment risk levels of the intersection at those times of day to provided more accurate risk scores.

The total premium calculated for a potential insurance policy offering covering the vehicle (e.g., determined at 508 of FIG. 5) may, to continue the example, be graded between "B" and "C" (e.g., at 510 of FIG. 5) or between "Fair" and "Average". The resulting combination of risk score and premium rating may be plotted on the risk matrix 600, as represented by a data point 604 shown in FIG. 6. The data point 604, based on the surface segment-influenced risk score and the corresponding surface segment-influenced premium calculation, is plotted in the second quadrant 602*b*, in a position indicating that while the risk of insuring the vehicle is relatively high, the calculated premium is probably large enough to compensate for the level of risk. In some embodiments, an insurer may accordingly look favorably upon issuing such as insurance policy to the client to cover the vehicle in question and/or may consummate a sale of such a policy to the consumer (e.g. based on the evaluation output at 512 of FIG. 5, such as decision and/or sale may be made).

Turning now to FIG. 7, a flow diagram of a method 700 according to some embodiments is shown. In some embodiments, the method 700 may comprise a surface segment-based insurance premium determination method. According to some embodiments, the method 700 may be implemented, facilitated, and/or performed by or otherwise associated with any of the systems 100, 300, 900 of FIG. 1, FIG. 3, and/or FIG. 9 herein. In some embodiments, the method 700 may be associated with one or more of the methods 200, 400, 500 of FIG. 2, FIG. 4, and/or FIG. 5 herein.

According to some embodiments, the method 700 may comprise determining (e.g., by a processing device) information descriptive of an exposure of an object to surface segments, at 702 (e.g., 702*a-b*). Client and/or client device/vehicle location information may be determined, for example, at one or more points in time, and such location/time information may be correlated to available surface segment data to determine a surface segment type, metric, rank, and/or score associated with the location/time. In the case that a driver utilizes a telematics and/or GPS device when driving a vehicle, for example, location and/or time data may be recorded to determine which roads, intersections, etc. are traveled upon (and/or for how long—timewise and/or distance-wise). Such roadway usage data may then be compared and/or cross-tabulated or checked with available surface segment data to determine, for example, how many miles per month are spent on major highways, on narrow rural roads, on gravel roads, on concrete, on asphalt, and/or how many intersections, railroad crossings, and/or bridges or tunnels are traversed (each, for example, being descriptive of and/or comprising a different surface segment classification). According to some embodiments, information descriptive of an exposure of the object to a first type of surface segment may be determined at 702*a* and/or information descriptive of an exposure of the object to a second type of surface segment may be determined at 702*b*.

In some embodiments, for example, location data for a customer/client and/or device associated therewith (e.g., a cell phone and/or vehicle) may be determined with respect to one or more surface segment types and/or classifications. In some embodiments, location and/or surface segment data may be inferred and/or estimated, such as in the case actual location and/or surface segment data is not available and/or easily accessible. In the case that traffic camera footage captures an image of a vehicle owned and/or operated by an insured traveling on a particular road and/or in a certain direction in a particular intersection, for example, the location of the road or intersection may be analyzed to determine a likely route that the insured is (or was) driving. In the case that the intersection is less than a mile from the insured's home, for example, and comprises a point along a typical and/or likely route to the home (e.g., and the travel direction and/or timing matches what would be expected with regard to a trip home), it may be inferred that the insured is (or was) traveling on such a route. Surface segment characteristics of the route may then be looked-up, calculated, and/or otherwise determined. In some embodiments, such surface segment usage data may be recorded and/or tabulated over a period of time (such as a day, month, quarter, and/or year).

According to some embodiments, the method 700 may comprise determining (e.g., by the processing device) risk metrics of the surface segment types, at 704 (e.g., 704*a-b*). At 704*a*, for example, a first risk metric of the first type of surface segment may be determined. A database record indicative of a risk metric associated with the first type of surface segment may, for example, be accessed. In some embodiments, the first risk metric may be based on an analysis of loss data associated with the first type of surface segment. A first type of surface segment comprising a roadway section in an area prone to heavy rains at night, that does not have embedded reflective lane markers, for example, may be associated with a first risk metric of ninety (90)—e.g., on a scale of one (1) to one hundred (100).

In some embodiments, at 704*b*, a second risk metric of the second type of surface segment may be determined. A database record indicative of a risk metric associated with the second type of surface segment may, for example, be accessed. In some embodiments, the second risk metric may be based on an analysis of loss data associated with the second type of surface segment. A second type of surface segment comprising a roadway section in an area prone to heavy rains at night, that does have embedded reflective lane markers, for example, may be associated with a risk metric of forty-three (43)—e.g., on a scale of one (1) to one hundred (100).

According to some embodiments, the method 700 may comprise determining (e.g., by the processing device), risk exposure(s), at 706 (e.g., 706*a-b*). At 706*a*, for example, a first risk exposure based on (i) the exposure of the object to the first type of surface segment (e.g., the amount of time the vehicle spends on the first type of surface segment) and (ii) the first risk metric, may be determined. The exposure of the object to the first surface segment type (e.g., the amount of time the vehicle spends on the first type of surface segment—in absolute numbers or as a percentage of a particular time period such as a month, quarter, or year) may, for example, be multiplied by (and/or otherwise calculated with) the first risk metric to define the first risk exposure. Utilizing the example data from 704*a* supra, and assuming that the amount of time the vehicle spends on the first type of surface segment per year is twenty (20) hours, the first risk exposure may, in some embodiments, be equivalent to one thousand eight hundred (1800; e.g., twenty (20) times ninety (90)).

In some embodiments, at 706*b*, a second risk exposure based on (i) the exposure of the object to the second type of surface segment (e.g., the amount of time the vehicle spends on the second type of surface segment) and (ii) the second risk metric, may be determined. The amount of time the vehicle spends on the second type of surface segment (in absolute numbers or as a percentage of a particular time period such as a month, quarter, or year) may, for example, be multiplied by (and/or otherwise calculated with) the second risk metric to define the second risk exposure. Utilizing the example data from 704*b* supra, and assuming that the amount of time the vehicle spends on the second type of surface segment per year is one hundred (100) hours, the second risk exposure may, in some embodiments, be equivalent to four thousand three hundred (4300; e.g., one hundred (100) times forty-three (43)). In some embodiments, the value(s) of any or all risk exposure values may be looked-up, received from a third-party source (e.g., in response to a transmittal of time and risk metric data), and/or otherwise determined.

According to some embodiments, the method 700 may comprise determining (e.g., by the processing device), based at least in part on the first and second risk exposures, an insurance rate for the object (e.g., a person, vehicle, and/or other object), at 708. While typical insurance and/or other underwriting product determinations may be based on certain typical variables such as number of miles driven per year, where a vehicle is garaged/parked, and/or the driving record of the primary driver, for example, in accordance with some embodiments, such determinations may also or alternatively be based on risk characteristics of surface segments to which the insured is exposed. In the case of a personal injury policy, for example, the more often a client traverses smooth and/or slippery surfaces (e.g., during a typical work day) as opposed to textured and/or non-slip surfaces, the higher the client's insurance premium, deductible, and/or surcharges may be. In some embodiments, the insurance rate may be based on a weighted calculation taking into account risk factors of various surface segments and amounts of time/distance associated with the insured's exposure to such various surface segments/segment types/classes, etc.

In some embodiments, the method 700 may comprise determining first weather condition information for at least one portion of time the vehicle spends on the first type of surface segment, and/or determining a first weather risk metric for the first weather condition information for the at least one portion of the time the vehicle spends on the first type of surface segment, wherein the first risk metric of the first type of surface segment comprises the first weather risk metric. In the case that the first risk metric does not otherwise take into account weather conditions, for example, the combination of the first weather condition and the first surface segment type may be analyzed and/or otherwise utilized to determine the first risk metric. In some embodiments, for example, different weather conditions may cause and/or relate to different risk metrics, even for the same type of surface segment (e.g., in the case that the type of surface segment does not otherwise take into account weather conditions).

According to some embodiments, the method 700 may comprise determining second weather condition information for at least one portion of time the vehicle spends on the second type of surface segment, and/or determining a second weather risk metric for the second weather condition information for the at least one portion of the time the vehicle spends on the second type of surface segment, wherein the second risk metric of the second type of surface segment comprises the second weather risk metric.

In some embodiments, the determining of the information descriptive of the amount of time the vehicle spends on the first type of surface segment, may comprise determining credit card purchase transaction location information descriptive of the vehicle being located on a surface segment of the first type, and/or determining credit card purchase transaction timing information descriptive of the amount of time the vehicle spends on the surface segment of the first type. In the case that it is known or determined that a client purchases a coffee at a certain retail establishment every weekday (or most or many weekdays) between 8:15 AM and 8:35 AM, for example, it may be inferred that the client takes a route to work that includes the retail establishment as a waypoint. Such information may be utilized, for example, to estimate and/or predict likely routes and, accordingly, likely amount of time spent traversing various types of associated surface segments.

According to some embodiments, the determining of the information descriptive of the amount of time the vehicle spends on the first type of surface segment, may comprise determining telematic device location information descriptive of the vehicle being located on a surface segment of the first type, and/or determining telematic device timing information descriptive of the amount of time the vehicle spends on the surface segment of the first type. A telematic device of an insurance company and/or of a partner, agent, and/or vendor of the insurance company, for example, may be configured to provide location information that may be utilized to determine surface segment and/or timing data. In some embodiments, the telematics device may be configured to send start-stop signals when a vehicle enters-exits particular surface segments and/or particular surface segment types. In some embodiments, the telematics device may be configured to provide surface segment data in the form of an identifier of a surface segment type (e.g., toll road="TR") and a time/distance identifier (e.g., time on type "TR"=twenty-two (22) minutes or distance on type "TR"=sixteen (16) miles). In some embodiments, the telematic device may be configured to determine surface segment types. In the case that the telematics device comprises appropriate sensors and a surface segment type is defined by a roadway pitch, for example, the telematics device may determine that (or when) a traveled roadway meets certain pitch criteria (e.g., to be classified in certain surface segment categories).

In some embodiments, the insurance rate may comprise an initial insurance premium rate plan. In some embodiments, the insurance rate comprises an adjustment to an initial insurance premium rate plan. In some embodiments, either or both risk metrics of either or both types of surface segments may comprise a risk metric based at least in part on one or more of: (i) a surface material of the first type of surface segment; (ii) a geometric characteristic of the first type of surface segment; (iii) a wildlife condition adjacent to the first type of surface segment; (iv) a construction status of the first type of surface segment; and (v) lighting characteristic of the first type of surface segment.

In some embodiments, the first and second risk metrics may be different. In some embodiments, the insurance rate for the vehicle (and/or other object) may be further based at least in part on at least one of: (i) a risk exposure of a driver of the vehicle; and (ii) a risk exposure of a vehicle type of the vehicle. In some embodiments, surface segment exposure data may be tabulated for one or more particular customers.

Turning to FIG. 8, for example, a block diagram of an exemplary data storage structure 840 according to some embodiments is shown. In some embodiments, the data storage structure 840 may store data for a plurality of customers 844-1 with respect to a plurality of surface segment types 844-2. As is depicted in FIG. 8, for example, it may be determined that customer 844-1 "Bob Smith" has traveled on surface segment type 844-2 "H1" a total of three (3) units (e.g., minutes, hours, days, miles, kilometers, feet), while customer "Mary Jones" has traveled two hundred and nineteen (219) units on surface segment type "C2". In some embodiments, such surface segment data may enhance the protection (and/or maintain) the privacy of customers. In some embodiments, for example, while location information may be utilized to determine surface segment type 844-2 correlations, actual location may not need to be stored or even known. The exemplary data storage structure 840 may only need to store and/or a system pricing insurance policies based on such information may only need to 'know', for example, time/distance and surface segment type 844-2. Actual location may be irrelevant. Whether the driver/customer traversed an "H3" surface segment type 844-2 in Hawaii or in Alaska, assuming weather and/or other environmental conditions are considered in the determination of what constitutes an "H3" surface segment type 844-2 or are not relevant, may not matter for purposes of determining underwriting product pricing and/or risk assessment as described herein. In some embodiments, such as in the case that a telematics and/or other device is configured to determine surface segment types (e.g., via accessing stored data and/or rules), actual location data may not need to be transmitted beyond the vehicle—e.g., the telematics device may simply transmit indications of surface segment types 844-2 and time/distance data (and/or an identifier of the customer 844-1).

While quantitative numerical data is generally depicted as being stored in the exemplary data storage structure 840, other types of data may also or alternatively be stored. With respect to customer 844-1 "Mary Jones" and surface segment types 844-2 "RR1" and "RR2" (e.g., at-grade railroad crossings and uncontrolled railway crossings, respectively), for example, a threshold flag of "Y" or "N" (e.g., for "Yes, she has traveled through/across x number of at-grade railroad crossings" and/or "No, she has not traveled through/across x number of uncontrolled railway crossings") may be stored. In some embodiments, such as in the case of customer 844-1 "Transco" (e.g., a business and/or fleet customer) with respect to the same surface segment types 844-2 ""RR1" and "RR2", a qualitative identified such as "HI" (or "High") and/or 10" (or "Low") may also or alternatively be stored. In some embodiments, such as in the case that the customer 844-1 comprises a business customer such as "Transco", data descriptive of various fleets, sub-fleets, vehicles, and/or category, group, and/or type of vehicle/vehicle use, etc., may also or alternatively be stored (not explicitly shown in FIG. 8). In some embodiments, data descriptive of surface segment type 844-2 exposure may also or alternatively be plotted as a surface segment type 844-2 map.

Figure 9:
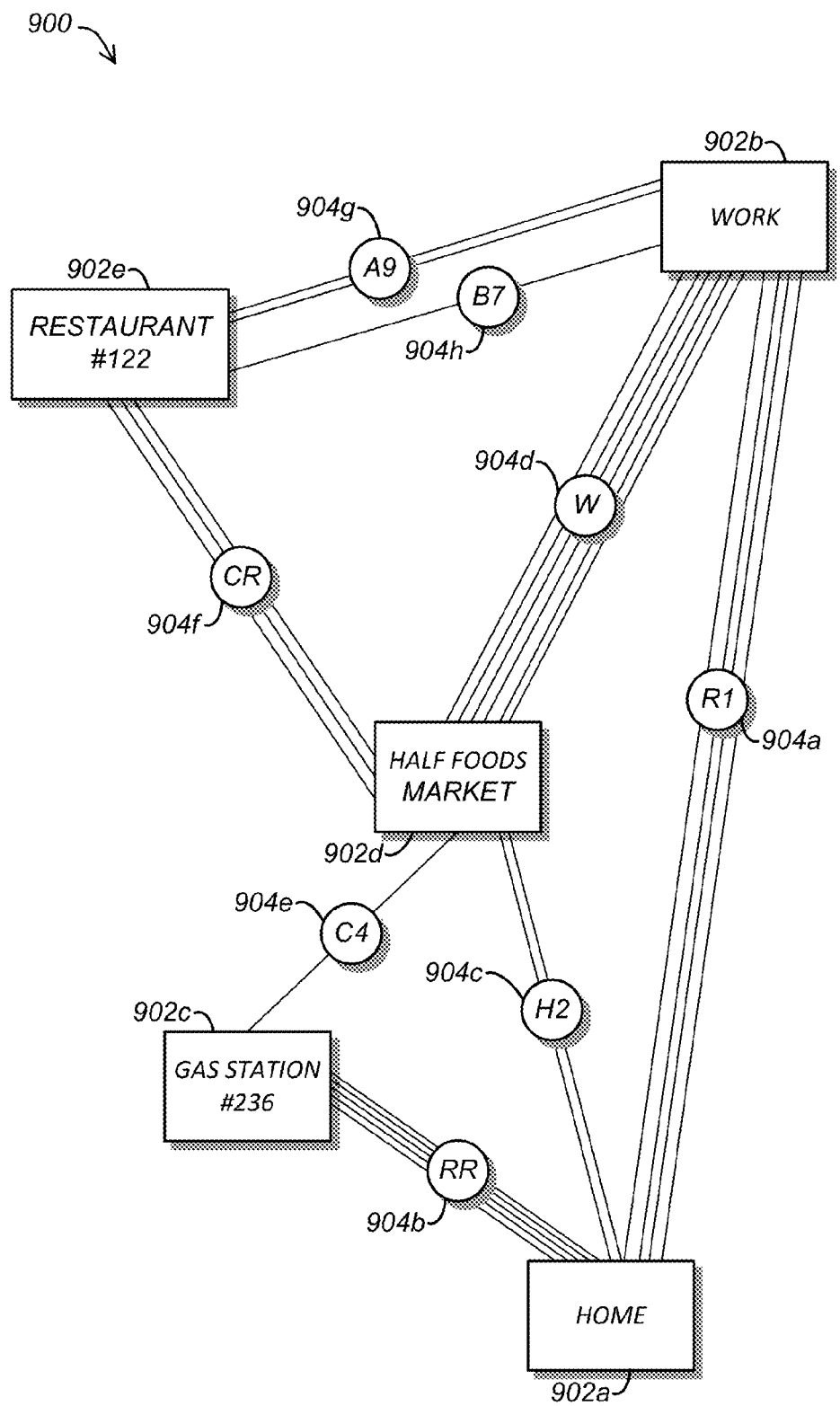
FIG. 9 is a block diagram of a system according to some embodiments.

Referring to FIG. 9, for example, a block diagram of a system 900 according to some embodiments is shown. In some embodiments, the system 900 may comprise a surface segment type map (e.g., a graphical representation of the data stored in the exemplary data storage structure 840, such as for a particular customer). The system 900 may, for example, comprise a plurality of location nodes 902a-e connected by a plurality of surface segment types 904a-h. In some embodiments, the magnitude of the amount of time and/or distance (e.g., exposure) associated with a particular surface segment type 904a-h may be represented by a number, type, thickness, and/or spacing or density of lines. As depicted in FIG. 9, for example, the represented customer has experienced (or is estimated to have experienced) a relatively high degree of exposure to the "RR" surface segment type 904b (e.g., five (5) lines and/or lines spaced closely together) while only a relatively small degree of exposure to the "C4" surface segment type 904e (e.g., a single line or a line of a thin width). In some embodiments, the expertise, experience, and/or training of a driver may also or alternatively be depicted and/or considered with respect to determining frequencies, weighting factors, and/or risk factors descriptive of the use of the objects/vehicles represented in FIG. 9. A customer and/or client or other driver that has a relatively high level of experience driving on a certain surface segment type, for example, despite and/or due to the frequency with which such surface segment type is realized by the driver, may be considered as a weighting factor such as in reducing the perceived and/or expected risk associated with the driver.

According to some embodiments, a first location node 902a may comprise a customer's "Home" (e.g., home address and/or domicile) and/or a second location node 902b may comprise the customer's "Work" (e.g., place of business, such as in the case that the place of business is different and/or distinct from the "Home" 902a). In some embodiments, it may be known that, of the plurality of likely routes that the customer can take to get from "Home" 902a to "Work" 902b, each route comprises and/or is defined by (or predominantly by) a first surface segment type 904a identified as "R1" (e.g., a rural route having normal geometric and/or environmental conditions). In such embodiments, details of specific routes taken between "Home" 902a and "Work" 902b may not be important. Merely the frequency, time spent, and/or distance traversed between "Home" 902a and "Work" 902b may be monitored and/or analyzed, for example, to determine an amount of exposure (e.g., of the customer and/or a device/vehicle of the customer's) to the "R1" surface segment type 904a.

In some embodiments, it may be known (or estimated) that the customer frequently (e.g., relatively frequently, such as every day) travels from "Home" 902a to a gas station (identified as "Gas Station #236) 902c, and/or that in doing so traverses a railway crossing identified by a second surface segment type 904b. It may be determined, for example, that the "RR" surface segment type 904b must be traversed to get from "Home" 902a to "Gas Station #236" 902c and/or that such a traversal is probably or likely (e.g., based on an analysis of available routes the customer may take and certain other variables such as distance, time, complexity, and/or popularity of the various routes). In some embodiments, traversal of the "RR" surface segment type 904b may be detected and/or inferred from sensor readings, such as provided by an on-board telematics device (e.g., the bumps associated with crossing a railway may be identified by a vehicle-related sensor, such as a shock sensor and/or accelerometer (built-in and/or of a mobile device such as a smart phone)).

According to some embodiments, it may be determined (such as by utilization of a telematics and/or location device such as a GPS device) that the customer travels on a third surface segment type 904c (e.g., with some relatively low frequency) identified as "H2", between "Home" 902a and a retail establishment 902d, such as the exemplary "Half Foods Market" 902d. In some embodiments, it may be determined that the customer travels between the "Half Foods Market" 902d and "Work" 902b with some degree of relatively high frequency via a fourth surface segment type 904d identified as "W" and/or that the customer occasionally (or infrequently) travels between the "Gas Station #236" 902c and the "Half Foods Market" 902d via a fifth surface segment type 904e identified as "C4". Even in the case telematics and/or location devices are not utilized, for example, it may be determined that the customer was located at or proximate to the "Half Foods Market" 902d at some point in time. It may also be known or determined that the customer was at "Work" 902b at some related point in time—such as within minutes or hours before or after. The distance(s) (e.g., route dependent) between the "Half Foods Market" 902d and "Work" 902b may be compared to the time data to determine a likelihood that the customer drove/traveled between the "Half Foods Market" 902d and "Work" 902b. In some embodiments, such time and/or location data may be gathered and/or determined with respect to one or more financial transactions, such as a credit card purchase at the "Half Foods Market" 902d and/or one or more toll transactions (e.g., associated with the "W" surface segment type 904d).

In some embodiments, it may be determined that the customer travels (or is likely to travel; e.g., based on a scheduled calendar event, meeting, and/or reservation) from the "Half Foods Market" 902d to a "Restaurant #122" 902e, e.g., via a sixth surface segment type 904f identified as "CR". In some embodiments, it may be determined that the customer travels between "Work" 902b and the "Restaurant #122" 902e utilizing a seventh surface segment type 904g identified as "A9," as well as an eighth surface segment type 904h identified as "B7". As depicted in FIG. 9, the "A9" surface segment type 904g may be utilized twice as often, frequently, and/or for twice as much distance as the "B7" surface segment type 904h. In some embodiments, a single roadway may be utilized to travel between "Work" 902b and the "Restaurant #122" 902e, but may be represented by and/or comprise both of the "A9" surface segment type 904g and the "B7" surface segment type 904h. The difference in frequency, in the case that a single roadway or roadway segment is represented, may be descriptive of a situation where the "A9" surface segment type 904g is "active" and/or descriptive of the roadway more often than the "B7" surface segment type 904h. In the case that the "A9" surface segment type 904g is descriptive of roadway geometry, for example, the "B7" surface segment type 904h may be descriptive of a particular weather and/or other environmental condition on the roadway (e.g., rain, animal crossing likelihood during certain seasons, and/or lighting conditions such as sun glare, high contrast shadows, etc.).

Figure 10:
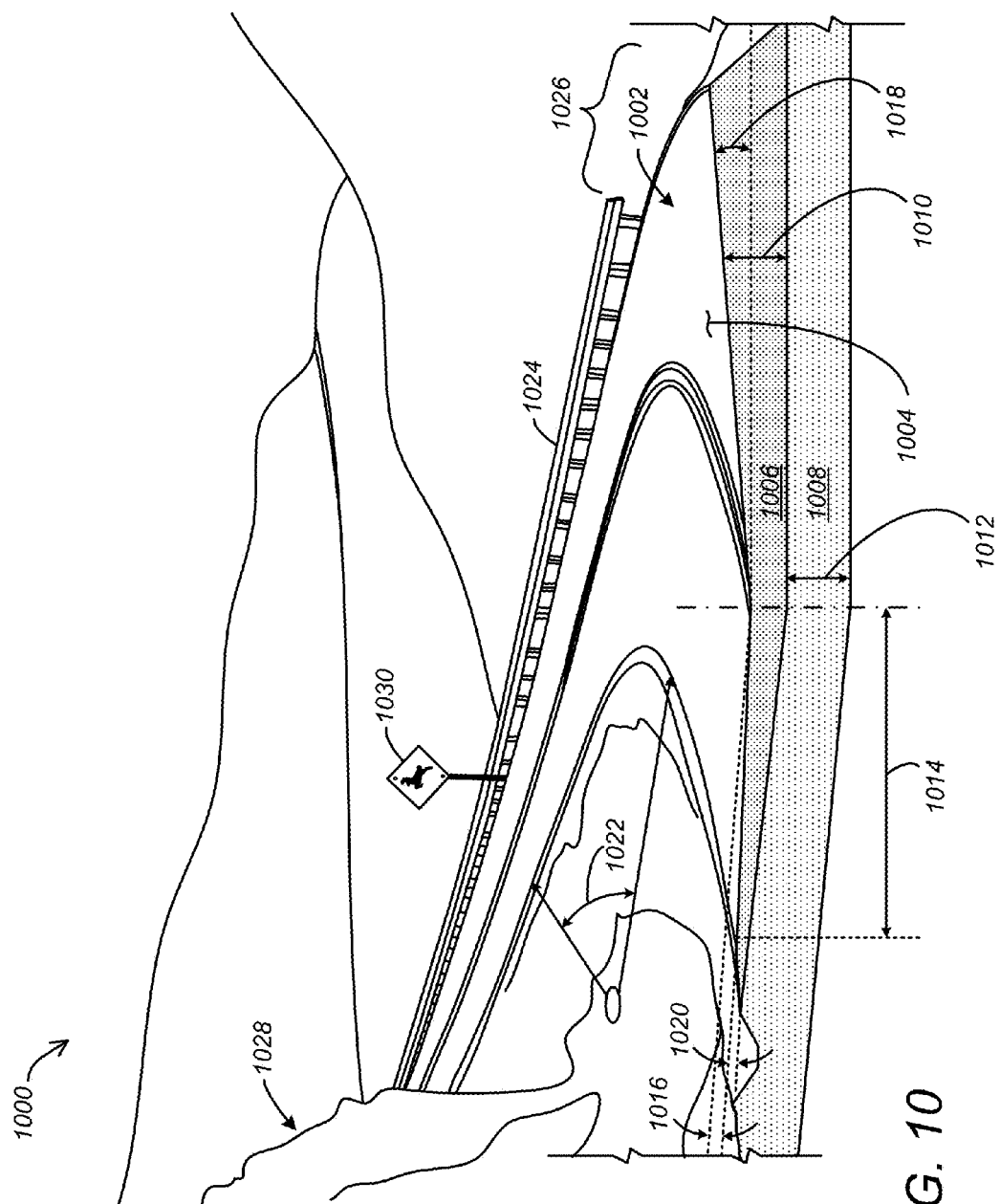
FIG. 10 is a perspective cross-section diagram of roadway according to some embodiments.

Referring now to FIG. 10, a system 1000 according to some embodiments is shown. The system 1000 may, for example, comprise a transportation object, surface segment, and/or surrounding environment and/or area. As depicted, the system 1000 may comprise a portion of a roadway 1002 including a down-grade curve or turn. The roadway 1002 may generally comprise and/or define a roadway surface 1004 such as a poured concrete and/or Portland cement concrete, gravel, dirt, asphalt concrete (e.g., "blacktop" or "asphalt"), tar and chip (or oil and stone), and/or other type or configuration of surface, coating, and/or sealant or treatment. In some embodiments, such as depicted in FIG. 10 (although not readily discernible), the roadway surface 1004 may comprise a relatively homogenous "asphalt" surface as is typical on many roadways. In some embodiments, different portions of the roadway 1002 may comprise different types and/or combinations or configurations of roadway surfaces 1004. In some embodiments, sections of the roadway 1002 having identical and/or similar roadway surfaces 1004 may be considered to be in the same surface segment class (e.g., all asphalt roads may be grouped in a first surface segment class, while all Portland cement concrete roads may be grouped in a second surface segment class).

According to some embodiments, the roadway 1002 may be defined by and/or comprise a layer (or one or more layers) of roadway base material 1006 (e.g., a "base course"), such as asphalt, Reclaimed Asphalt Pavement (RAP), asphalt millings, and/or "blacktop cookies". In some embodiments, the roadway surface 1004 may comprise an upper and/or exposed portion of the roadway base material 1006. In some embodiments, the roadway surface 1004 may comprise a different material than the roadway base material 1006 (e.g., the roadway 1002 may be surfaced, resurfaced, and/or "sealcoated" with a different material than the roadway base material 1006). In some embodiments, the roadway base material 1006 may sit, rest, and/or otherwise be disposed on top of and/or above a roadway "subbase" material 1008. The roadway subbase material 1008 may, for example, comprise one or more layers of compacted aggregate such as gravel, clay, process, and/or other suitable material(s) as is or becomes desirable (e.g., unbound granular materials such as crushed stone and/or Cement-Bound Materials (CBM) of various classifications and/or grades). In some embodiments, although not shown in FIG. 10, other layers and/or materials such as geo-grid and/or other soil stabilization materials may be utilized in and/or between the roadway base material 1006 and/or the roadway subbase material 1008.

According to some embodiments, the roadway base material 1006 and/or the roadway subbase material 1008 may comprise and/or define one or more thicknesses 1010, 1012, respectively. As depicted in FIG. 10, the thicknesses 1010, 1012 may vary along the cross-section of the roadway 1002. In some embodiments, the roadway 1002 may be categorized in and/or by more than one surface segment type and/or classification. The roadway 1002 may, for example, comprise a special high-traction sealcoat surface 1004 identified as surface segment type "A", a Hot Mix Asphalt Concrete (HMAC) roadway base material 1006 identified as surface segment type "H1", and/or a second-grade CBM (e.g., "CBM 2") roadway subbase material 1008 identified as "22". In some embodiments, the particular surface segment designation and/or class may accordingly be identified as "AH122". In some embodiments, only those roadway characteristics deemed to be important for risk assessment and/or insurance classification may be included in a surface segment classification. It may be determined, for example that the roadway subbase material 1008 does not typically affect risk characteristics of the roadway 1002, and the surface segment classification may accordingly simply comprise "AH1".

In some embodiments, geometric characteristics of the roadway 1002 may be determined to be relevant to risk and/or insurance determinations. A travel lane width 1014 (and/or number and/or configuration (e.g., one-way, HOV) of travel lanes) may, for example, be determined to negatively affect roadway safety when it is less than a certain value (e.g., twenty-five feet (25 ft.)) and/or when it is less than a certain value where average speeds exceed some threshold value (e.g., fifty miles per hour (50 mph)). In some embodiments, the roadway 1002 may comprise a crown 1016 defined in terms of vertical elevation change (e.g., six inches (6 in.)) and/or as a slope or grade (e.g., two percent (2%)) from the centerline to the Edge of Pavement (EoP) or gutter. In some embodiments, the roadway 1002 may also or alternatively comprise a "superelevation" 1018, such as on the outside lane of the curve as shown in FIG. 10. In some embodiments, the roadway 1002 may comprise a gutter 1020, such as on the inside edge of the curve as shown in FIG. 10. According to some embodiments, the curve of the roadway 1002 may be defined by and/or comprise a curvature 1022 (e.g. radius and/or rate of curve). In some embodiments, the roadway 1002 may comprise various attributes and/or features such as a guardrail 1024. In some embodiments, portions of the roadway 1002 may be defined and/or characterized (e.g., as a surface segment type) by a lack of various attributes or features. An area 1026 that lacks a guardrail 1024, particularly around a curve as shown in FIG. 10, for example, may comprise and/or define a surface segment type that is associated with a higher risk level than an area or segment that comprises the guardrail 1024.

According to some embodiments, environmental characteristics of the roadway 1002 may comprise landscape features 1028 (such as line-of-sight obstacles, falling rock zones, and/or trees or overhead power lines) and/or areas prone to animal crossings 1030. In some embodiments, any or all of the geometric and/or environmental characteristics, attributes, and/or features of the roadway 1002 may be utilized to define, develop, calculate, determine, and/or utilize surface segment data, such as to determine and/or manage risk and/or price or sell underwriting products as described herein.

Figure 11:
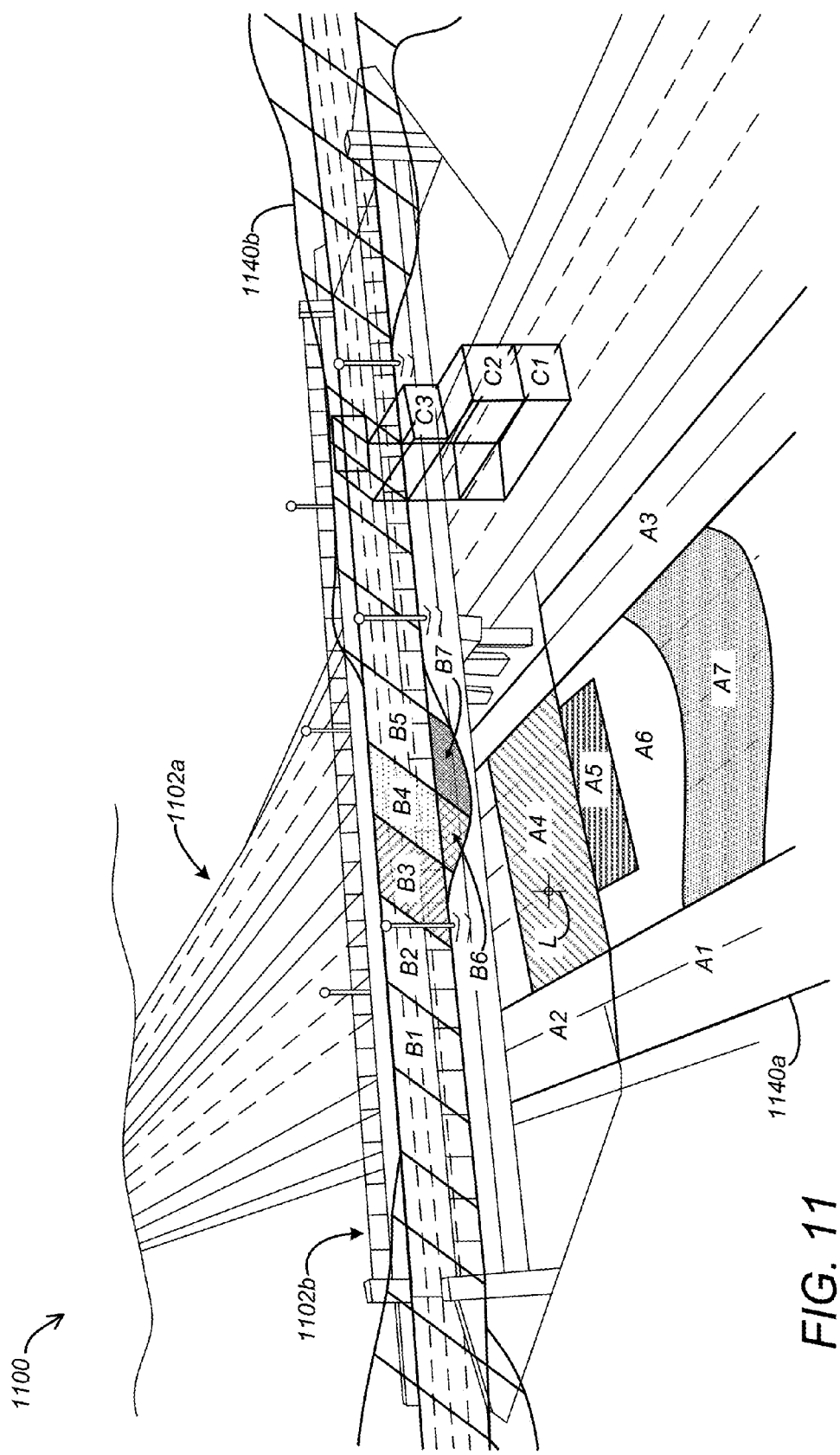
FIG. 11 is a perspective diagram of a system according to some embodiments.

Referring now to FIG. 11, a system 1100 according to some embodiments is shown. The system 1100 may, for example, comprise a transportation object, surface segment, and/or surrounding environment and/or area. As depicted, the system 1100 may comprise a portion of a first roadway 1102a passing under a portion of a second roadway 1102b (e.g., an "overpass"). Each respective roadway 1102a-b (and/or surrounding areas) may be characterized by and/or effectively divided into various grid segments as defined by a first grid overlay 1140a and a second grid overlay 1140b, respectively. The grid overlays 1140a-b may, for example, comprise one or more Digital Elevation Models (DEM), map and/or attribute layers, surface models, map projections, etc. In some embodiments, one or more of the grid overlays 1140a-b may be similar in configuration and/or functionality to the "risk zones" as described in commonly assigned, co-pending U.S. patent application Ser. No. 13/334,897 filed on Dec. 22, 2011, in the name of Collins et al. and titled "SYSTEMS AND METHODS FOR CUSTOMER-RELATED RISK ZONES", and/or commonly assigned, co-pending U.S. patent application Ser. No. 13/335,476 filed on Dec. 22, 2011, in the name of Collins et al. and titled "SYSTEMS AND METHODS FOR CLIENT-RELATED RISK ZONES", the risk zone concepts of each of which are hereby incorporated by reference herein.

According to some embodiments, the first grid overlay 1140a may be divided into a plurality of distinguishable (in some embodiments, unique and/or mutually-exclusive, while in other embodiments, potentially overlapping) grid segments ("A1" through "A7", as depicted) descriptive of characteristics of the first roadway 1102a. A first grid segment "A1", for example, may be descriptive of a shoulder and/or drainage area zone adjacent to the first roadway 1102a, while a second grid segment "A2" may be descriptive of a shoulder and/or drainage area zone that is both adjacent to the first roadway 1102a and under the second roadway 1102b (e.g., below the underpass). In some embodiments, such different grid segments "A1", "A2" may represent different surface segment and/or risk characteristics associated therewith. The second grid segment "A2" may generally be considered more risky than the first grid segment "A1", for example, due to shadows, differences in drainage, potential for debris falling from the overpass, etc. When combined and/or considered with respect to certain locations, areas, and/or weather patterns or events, however, the second grid segment "A2" may be considered less risky—such as due to being safer during hail, intense rain, and/or tornado weather events, for example.

Similarly, according to some embodiments, the second grid overlay 1140b may be divided into a plurality of distinguishable (in some embodiments, unique and/or mutually-exclusive, while in other embodiments, potentially overlapping) grid segments ("B1" through "B7", as depicted) descriptive of characteristics of the second roadway 1102b. Additional grid segments are depicted in FIG. 11, but not labeled, for ease of explanation. The grid segments "B1" through "B5", for example, may be descriptive of portions of the second roadway 1102b, while "B6" and "B7" may be descriptive of regions adjacent to the second roadway 1102b.

In some embodiments, elevation and/or three-dimensional characteristics of the system 1100 may be reflected by and/or in the various grid overlays 1140a-b. If it is known that a driver/vehicle and/or other object is geographically located at point "L", for example, the location may be ambiguous in the sense that the object may truly be located either on the overpass (e.g., on or adjacent to the second roadway 1102b) or under the overpass (e.g., in the first roadway 1102a). Such three-dimensional relationships may often be even more complex such as in cities with high-rise buildings and/or structures (e.g., different floors, elevated highways and/or rail lines) and/or subterranean tunnels and/or passageways (e.g., subways, utility accesses). In such embodiments, elevation and/or other data may be utilized to determine, for example, whether the object is in/on a fourth grid segment "A4" of the first grid overlay 1140*a* or in/on a third grid segment "B3" of the second grid overlay 1140*b*. As the various surface segment and/or risk characteristics of the two potential grid segments "A4" and "B3" may be quite different, it may be highly desirable in some embodiments to have and/or utilize the ability to differentiate between such geographically and/or spatially overlapping locations.

According to some embodiments, geographically and/or spatially overlapping grid segments such as a fifth grid segment "A5" of the first grid overlay 1140*a* and sixth and seventh grid segments "B6", "B7" of the second grid overlay 1140*b* may not only be descriptive of vastly different surface segment and/or risk data, but may also or alternatively be related (directly or indirectly). It may be known and/or determined, for example, that the sixth grid segment "B6" of the second grid overlay 1140*b* may generally be inaccessible (or accessible to only certain objects and/or personnel) and that any/most/certain location information that indicates the sixth grid segment "B6" will generally be assumed to actually be descriptive of the fifth grid segment "A5" of the first roadway 1102*a*. In some embodiments, in the case that it is determined that an object is actually located in/on the sixth and/or seventh grid segments "B6", "B7" of the second grid overlay 1140*b* (e.g., utilizing elevation and/or sensor data), the data/analysis of the fifth grid segment "A5" of the first roadway 1102*a*/first grid overlay 1140*a* may be altered, updated, and/or otherwise affected. It may be assumed, for example, that a worker and/or thrown or dropped object from the sixth and/or seventh grid segments "B6", "B7" of the second grid overlay 1140*b* may pose a threat to the fifth grid segment "A5" of the first grid overlay 1140*a* thereunder. In some embodiments, such a determination may trigger an alert and/or re-routing suggestions that may, for example, be provided to emergency and/or safety personnel and/or may be transmitted to one or more vehicles and/or devices (such as vehicles traveling on the first roadway 1102*a* and/or a traffic alert system/sign positioned to warn such drivers (not shown in FIG. 11)).

In some embodiments, the characteristics such as risk metrics of the fifth grid segment "A5" of the first grid overlay 1140*a* may reflect a likelihood (and/or relative higher likelihood) of falling objects (e.g., from the overpass). In some embodiments, the various grid segments may be dynamically shaped, configured, and/or updated and/or may vary for different drivers, vehicles, objects, etc. In the case of a vehicle (not shown) traveling on the first roadway 1102*a*, for example, the speed and/or capabilities (e.g., stopping distance) of the vehicle may be utilized to determine the boundaries of the fourth, fifth, sixth, and/or seventh "A4", "A5", "A6", "A7" grid segments of the first grid overlay 1140*a* and/or other characteristics thereof. It may be determined that the driver/vehicle has a lower likelihood and/or time/distance window indicative of being struck by a falling/thrown object from the overpass, for example, in the case that the vehicle is traveling faster. In some embodiments, faster speeds may increase the risk and/or boundaries of risky areas preceding the overpass (such areas not shown with respect to the first grid overlay 1140*a* in FIG. 11). Accordingly, different vehicles, drivers, and/or vehicle characteristics (e.g., speed and/or features—such as anti-lock brakes) may cause different grid overlays 1140*a-b* and/or different grid segments (and/or configurations thereof) to be determined, calculated, displayed, and/or otherwise processed or utilized (e.g., to determine a risk exposure of an object such as a person and/or vehicle).

In some embodiments, grid segments may be disposed in three (3) dimensions (i.e., three-dimensional grid segments). A first three-dimensional grid segment "C1", for example, may be descriptive of and/or associated with a particular level of risk, type of risk, and/or certain combinations of surface segment characteristics. In some embodiments, the first three-dimensional grid segment "C1" may be relevant to any vehicle traveling along the particular depicted lane of the first roadway 1102*a*. According to some embodiments, vehicles over a certain height may also enter and/or be associated with a second three-dimensional grid segment "C2", situated vertically above and adjacent, abutted, and/or coupled to the first three-dimensional grid segment "C1". In some embodiments, the characteristics of the first and second three-dimensional grid segments "C1" and "C2" may be combined additively (and/or in another preferred mathematical fashion) to determine an overall and/or combined risk of a particular object. As another example, a third three-dimensional grid segment "C3" may be associated with and/or descriptive of attributes of the second roadway 1102*b* and/or a portion thereof, and may overlap and/or overlay the first and/or second three-dimensional grid segments "C1" and "C2". The third three-dimensional grid segment "C3" may, for example, represent a level of risk associated with an object being thrown and/or dropped from the overpass. In some embodiments, an object located in (or at least partially in) the first three-dimensional grid segment "C1" may be associated with a risk level based on any or all of the overhead three-dimensional grid segments "C2" and/or "C3". In some embodiments, the average risk may be determined or the three-dimensional grid segment "C1", "C2", "C3" with the highest risk parameters may be applied and/or selected.

Figure 12:
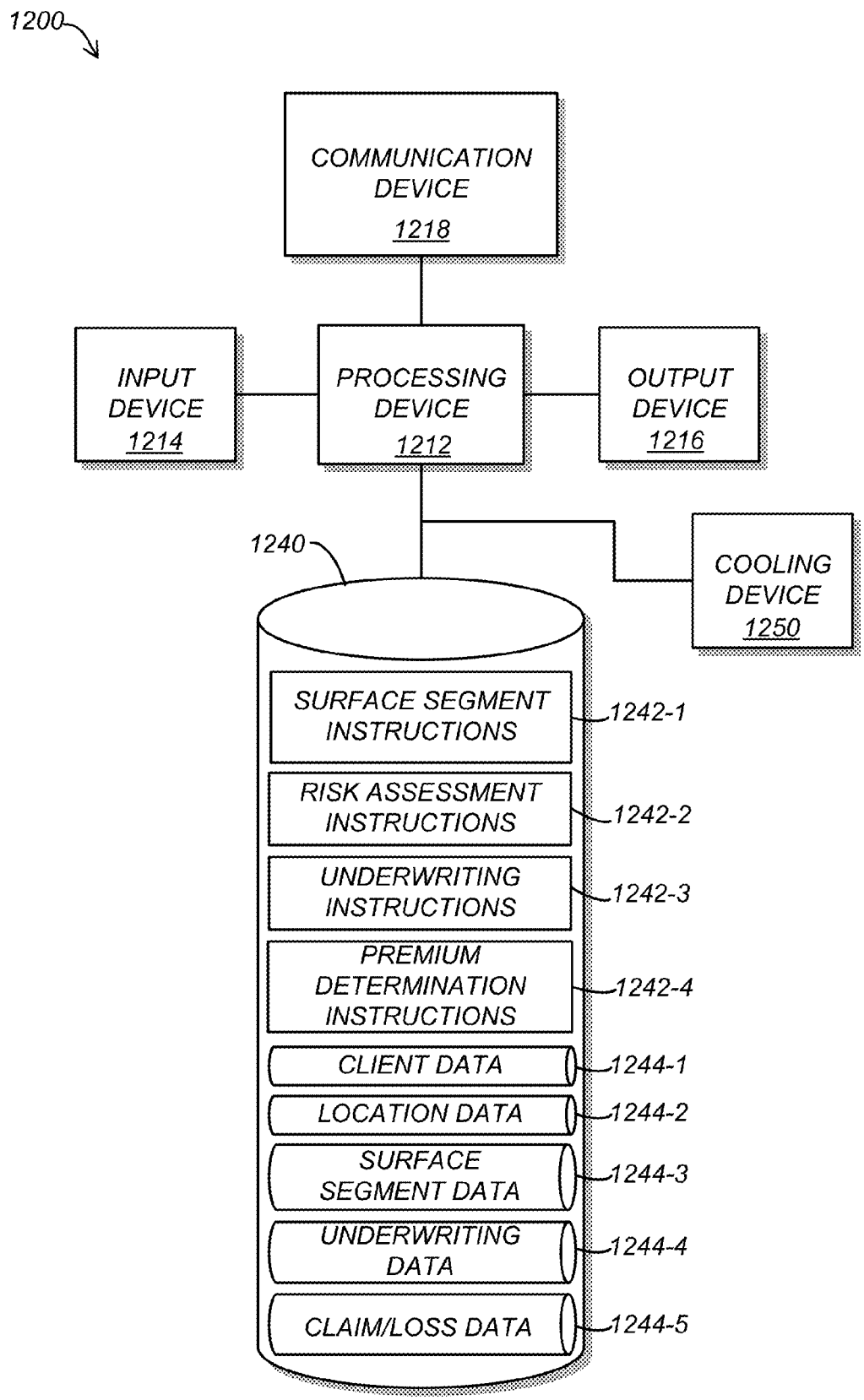
FIG. 12 is a block diagram of an apparatus according to some embodiments.
Figure 13A:
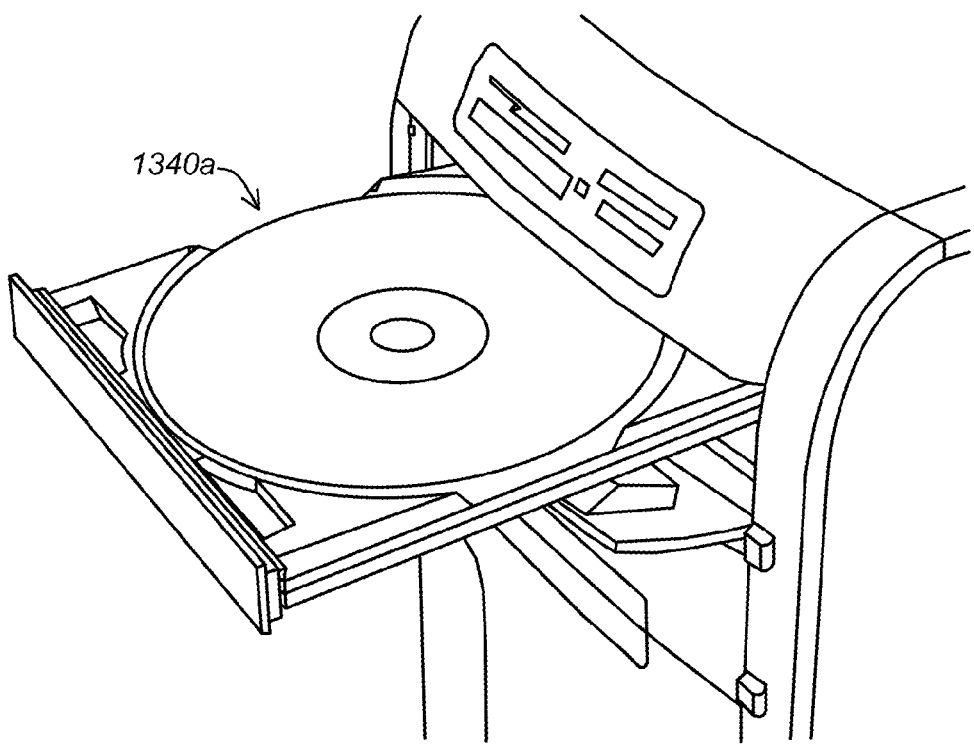
FIG. 13A, FIG. 13B, FIG. 13C, and FIG. 13D are perspective diagrams of exemplary data storage devices according to some embodiments.
Figure 13B:
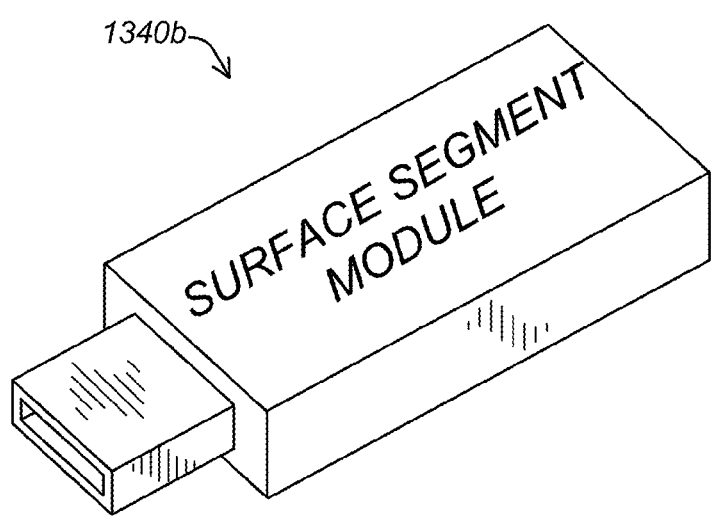
Figure 13C:
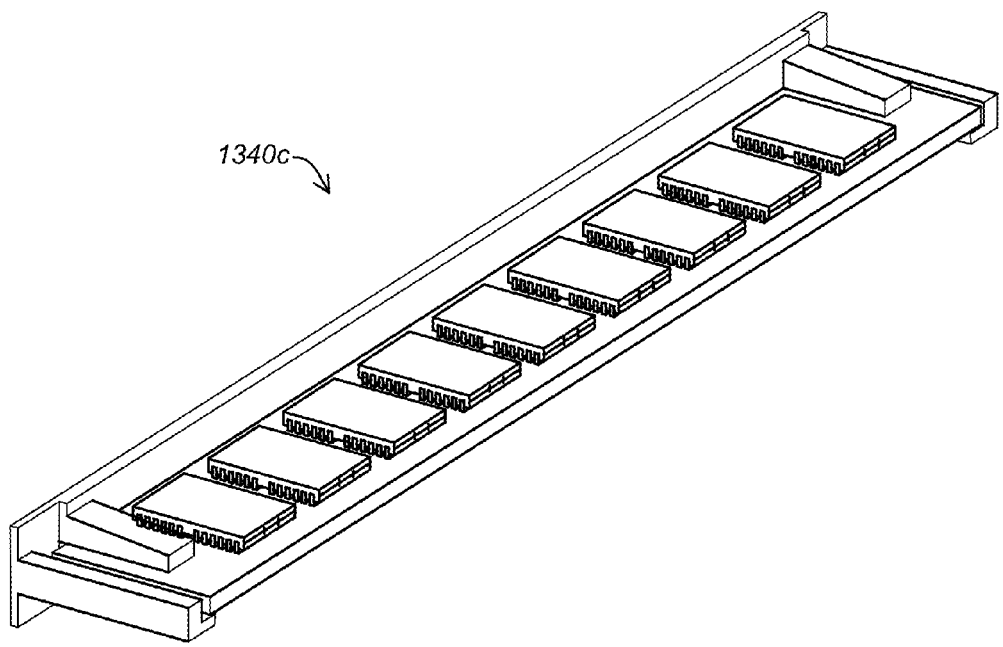
Figure 13D:
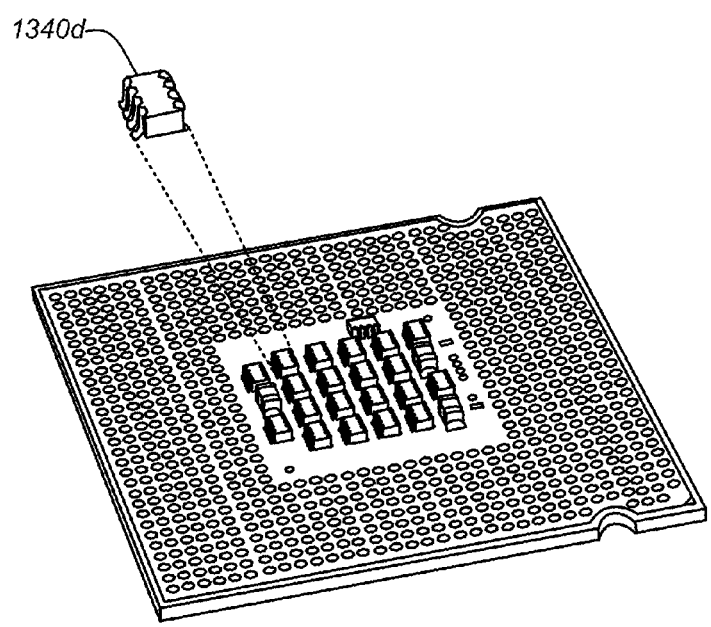

Turning to FIG. 12, a block diagram of an apparatus 1200 according to some embodiments is shown. In some embodiments, the apparatus 1200 may be similar in configuration and/or functionality to any of the controller device 110, the surface segment data processing device 310, the user devices 102*a-n*, the surface segment data sources 302*a-g*, the third-party device 106, and/or the surface segment data aggregator device 308, of FIG. 1 and/or FIG. 3 herein. The apparatus 1200 may, for example, execute, process, facilitate, and/or otherwise be associated with the methods 200, 400, 500, 700 of FIG. 2, FIG. 4, FIG. 5, and/or FIG. 7 herein. In some embodiments, the apparatus 1200 may comprise a processing device 1212, an input device 1214, an output device 1216, a communication device 1218, a memory device 1240, and/or a cooling device 1250. According to some embodiments, any or all of the components 1212, 1214, 1216, 1218, 1240, 1250 of the apparatus 1200 may be similar in configuration and/or functionality to any similarly named and/or numbered components described herein. Fewer or more components 1212, 1214, 1216, 1218, 1240, 1250 and/or various configurations of the components 1212, 1214, 1216, 1218, 1240, 1250 may be included in the apparatus 1200 without deviating from the scope of embodiments described herein.

According to some embodiments, the processor 1212 may be or include any type, quantity, and/or configuration of processor that is or becomes known. The processor 1212 may comprise, for example, an Intel® IXP 2800 network processor or an Intel® XEON™ Processor coupled with an Intel® E7501 chipset. In some embodiments, the processor 1212 may comprise multiple inter-connected processors, microprocessors, and/or micro-engines. According to some embodiments, the processor 1212 (and/or the apparatus 1200 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 1200 comprises a server such as a blade server, necessary power may be supplied via a standard AC outlet, power strip, surge protector, and/or Uninterruptible Power Supply (UPS) device.

In some embodiments, the input device 1214 and/or the output device 1216 are communicatively coupled to the processor 1212 (e.g., via wired and/or wireless connections and/or pathways) and they may generally comprise any types or configurations of input and output components and/or devices that are or become known, respectively. The input device 1214 may comprise, for example, a keyboard that allows an operator of the apparatus 1200 to interface with the apparatus 1200 (e.g., by a consumer, such as to purchase insurance policies priced utilizing surface segment metrics, and/or by an underwriter and/or insurance agent, such as to evaluate risk and/or calculate premiums for an insurance policy). In some embodiments, the input device 1214 may comprise a sensor configured to provide information such as encoded location and/or surface segment information to the apparatus 1200 and/or the processor 1212. The output device 1216 may, according to some embodiments, comprise a display screen and/or other practicable output component and/or device. The output device 1216 may, for example, provide insurance and/or investment pricing and/or risk analysis to a potential client (e.g., via a website) and/or to an underwriter or sales agent attempting to structure an insurance (and/or investment) product (e.g., via a computer workstation). According to some embodiments, the input device 1214 and/or the output device 1216 may comprise and/or be embodied in a single device such as a touch-screen monitor.

In some embodiments, the communication device 1218 may comprise any type or configuration of communication device that is or becomes known or practicable. The communication device 1218 may, for example, comprise a Network Interface Card (NIC), a telephonic device, a cellular network device, a router, a hub, a modem, and/or a communications port or cable. In some embodiments, the communication device 1218 may be coupled to provide data to a client device, such as in the case that the apparatus 1200 is utilized to price and/or sell underwriting products (e.g., based at least in part on surface segment data). The communication device 1218 may, for example, comprise a cellular telephone network transmission device that sends signals indicative of surface segment metrics to a handheld, mobile, and/or telephone device. According to some embodiments, the communication device 1218 may also or alternatively be coupled to the processor 1212. In some embodiments, the communication device 1218 may comprise an IR, RF, Bluetooth™, Near-Field Communication (NFC), and/or Wi-Fi® network device coupled to facilitate communications between the processor 1212 and another device (such as a client device and/or a third-party device, not shown in FIG. 12).

The memory device 1240 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 1240 may, according to some embodiments, store one or more of surface segment instructions 1242-1, risk assessment instructions 1242-2, underwriting instructions 1242-3, premium determination instructions 1242-4, client data 1244-1, location data 1244-2, surface segment data 1244-3, underwriting data 1243-4, and/or claim/loss data 1244-5. In some embodiments, the surface segment instructions 1242-1, risk assessment instructions 1242-2, underwriting instructions 1242-3, and/or premium determination instructions 1242-3 may be utilized by the processor 1212 to provide output information via the output device 1216 and/or the communication device 1218.

According to some embodiments, the surface segment instructions 1242-1 may be operable to cause the processor 1212 to process the client data 1244-1, location data 1244-2, surface segment data 1244-3, underwriting data 1243-4, and/or claim/loss data 1244-5 in accordance with embodiments as described herein. Client data 1244-1, location data 1244-2, surface segment data 1244-3, underwriting data 1243-4, and/or claim/loss data 1244-5 received via the input device 1214 and/or the communication device 1218 may, for example, be analyzed, sorted, filtered, decoded, decompressed, ranked, scored, plotted, and/or otherwise processed by the processor 1212 in accordance with the surface segment instructions 1242-1. In some embodiments, client data 1244-1, location data 1244-2, surface segment data 1244-3, underwriting data 1243-4, and/or claim/loss data 1244-5 may be fed by the processor 1212 through one or more mathematical and/or statistical formulas and/or models in accordance with the surface segment instructions 1242-1 to define one or more surface segment metrics, indices, and/or models that may then be utilized to inform and/or affect insurance and/or other underwriting product determinations and/or sales as described herein.

In some embodiments, the risk assessment instructions 1242-2 may be operable to cause the processor 1212 to process the client data 1244-1, location data 1244-2, surface segment data 1244-3, underwriting data 1243-4, and/or claim/loss data 1244-5 in accordance with embodiments as described herein. Client data 1244-1, location data 1244-2, surface segment data 1244-3, underwriting data 1243-4, and/or claim/loss data 1244-5 received via the input device 1214 and/or the communication device 1218 may, for example, be analyzed, sorted, filtered, decoded, decompressed, ranked, scored, plotted, and/or otherwise processed by the processor 1212 in accordance with the risk assessment instructions 1242-2. In some embodiments, client data 1244-1, location data 1244-2, surface segment data 1244-3, underwriting data 1243-4, and/or claim/loss data 1244-5 may be fed by the processor 1212 through one or more mathematical and/or statistical formulas and/or models in accordance with the risk assessment instructions 1242-2 to inform and/or affect risk assessment processes and/or decisions in relation to surface segment characteristics, as described herein.

According to some embodiments, the underwriting instructions 1242-3 may be operable to cause the processor 1212 to process the client data 1244-1, location data 1244-2, surface segment data 1244-3, underwriting data 1243-4, and/or claim/loss data 1244-5 in accordance with embodiments as described herein. Client data 1244-1, location data 1244-2, surface segment data 1244-3, underwriting data 1243-4, and/or claim/loss data 1244-5 received via the input device 1214 and/or the communication device 1218 may, for example, be analyzed, sorted, filtered, decoded, decompressed, ranked, scored, plotted, and/or otherwise processed by the processor 1212 in accordance with the underwriting instructions 1242-3. In some embodiments, client data 1244-1, location data 1244-2, surface segment data 1244-3, underwriting data 1243-4, and/or claim/loss data 1244-5 may be fed by the processor 1212 through one or more mathematical and/or statistical formulas and/or models in accordance with the underwriting instructions 1242-3 to cause, facilitate, inform, and/or affect underwriting product determinations and/or sales (e.g., based at least in part on surface segment data) as described herein.

In some embodiments, the premium determination instructions 1242-4 may be operable to cause the processor 1212 to process the client data 1244-1, location data 1244-2, surface segment data 1244-3, underwriting data 1243-4, and/or claim/loss data 1244-5 in accordance with embodiments as described herein. Client data 1244-1, location data 1244-2, surface segment data 1244-3, underwriting data 1243-4, and/or claim/loss data 1244-5 received via the input device 1214 and/or the communication device 1218 may, for example, be analyzed, sorted, filtered, decoded, decompressed, ranked, scored, plotted, and/or otherwise processed by the processor 1212 in accordance with the premium determination instructions 1242-4. In some embodiments, client data 1244-1, location data 1244-2, surface segment data 1244-3, underwriting data 1243-4, and/or claim/loss data 1244-5 may be fed by the processor 1212 through one or more mathematical and/or statistical formulas and/or models in accordance with the premium determination instructions 1242-4 to cause, facilitate, inform, and/or affect underwriting product premium determinations and/or sales (e.g., based at least in part on surface segment data) as described herein.

In some embodiments, the apparatus 1200 may function as a computer terminal and/or server of an insurance and/or underwriting company, for example, that is utilized to process insurance applications. In some embodiments, the apparatus 1200 may comprise a web server and/or other portal (e.g., an Interactive Voice Response Unit (IVRU)) that provides surface segment-based underwriting product determinations and/or products to clients.

In some embodiments, the apparatus 1200 may comprise the cooling device 1250. According to some embodiments, the cooling device 1250 may be coupled (physically, thermally, and/or electrically) to the processor 1212 and/or to the memory device 1240. The cooling device 1250 may, for example, comprise a fan, heat sink, heat pipe, radiator, cold plate, and/or other cooling component or device or combinations thereof, configured to remove heat from portions or components of the apparatus 1200.

Any or all of the exemplary instructions and data types described herein and other practicable types of data may be stored in any number, type, and/or configuration of memory devices that is or becomes known. The memory device 1240 may, for example, comprise one or more data tables or files, databases, table spaces, registers, and/or other storage structures. In some embodiments, multiple databases and/or storage structures (and/or multiple memory devices 1240) may be utilized to store information associated with the apparatus 1200. According to some embodiments, the memory device 1240 may be incorporated into and/or otherwise coupled to the apparatus 1200 (e.g., as shown) or may simply be accessible to the apparatus 1200 (e.g., externally located and/or situated).

Referring to FIG. 13A, FIG. 13B, FIG. 13C, and FIG. 13D, perspective diagrams of exemplary data storage devices 1340*a-d* according to some embodiments are shown. The data storage devices 1340*a-d* may, for example, be utilized to store instructions and/or data such as the surface segment instructions 1242-1, risk assessment instructions 1242-2, underwriting instructions 1242-3, premium determination instructions 1242-4, client data 1244-1, location data 1244-2, surface segment data 1244-3, underwriting data 1243-4, and/or claim/loss data 1244-5, each of which is described in reference to FIG. 12 herein. In some embodiments, instructions stored on the data storage devices 1340*a-d* may, when executed by a processor, cause the implementation of and/or facilitate the methods 200, 400, 500, 700 of FIG. 2, FIG. 4, FIG. 5, and/or FIG. 7 herein (or any portions or combinations thereof).

According to some embodiments, the first data storage device 1340*a* may comprise a CD, CD-ROM, DVD, Blu-Ray™ Disc, and/or other type of optically-encoded disk and/or other storage medium that is or becomes know or practicable. In some embodiments, the second data storage device 1340*b* may comprise a USB keyfob, dongle, and/or other type of flash memory data storage device that is or becomes know or practicable. In some embodiments, the third data storage device 1340*c* may comprise RAM of any type, quantity, and/or configuration that is or becomes practicable and/or desirable. In some embodiments, the third data storage device 1340*c* may comprise an off-chip cache such as a Level 2 (L2) cache memory device. According to some embodiments, the fourth data storage device 1340*d* may comprise an on-chip memory device such as a Level 1 (L1) cache memory device.

The data storage devices 1340*a-d* may generally store program instructions, code, and/or modules that, when executed by a processing device cause a particular machine to function in accordance with one or more embodiments described herein. The data storage devices 1340*a-d* depicted in FIG. 13A, FIG. 13B, FIG. 13C, and FIG. 13D are representative of a class and/or subset of computer-readable media that are defined herein as "computer-readable memory" (e.g., non-transitory memory devices as opposed to transmission devices or media).

Some embodiments described herein are associated with a "user device" or a "network device". As used herein, the terms "user device" and "network device" may be used interchangeably and may generally refer to any device that can communicate via a network. Examples of user or network devices include a Personal Computer (PC), a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A system, comprising:
a specially-programmed electronic controller device;
an electronic telematics device coupled to a vehicle and in communication with the specially-programmed electronic controller device via a wireless electronic network; and
a non-transitory electronic memory device in communication with the specially-programmed electronic controller device, the non-transitory electronic memory device storing (i) risk parameter data in relation to surface segment types, and (ii) specially- programmed instructions that when executed by the specially-programmed electronic controller device result in:
determining information descriptive of an amount of time the vehicle spends on a first type of surface segment, comprising:
determining, based on data received from a third-party device and via the wireless electronic network, credit card purchase transaction location information descriptive of the vehicle being located on a surface segment of the first type; and determining, based on data received from a third-party device and via the wireless electronic network, credit card purchase transaction timing information descriptive of the amount of time the vehicle spends on the surface segment of the first type;
determining, based on data received from the electronic telematics device and via the wireless electronic network, information descriptive of an amount of time the vehicle spends on a second type of surface segment, the information being recorded by the electronic telematics device based on a measuring, by the electronic telematics device, of a physical roadway parameter that is indicative of the second type of surface segment;
determining, by accessing the risk parameter data stored in the non-transitory electronic memory device, a first risk metric of the first type of surface segment;
determining, by accessing the risk parameter data stored in the non-transitory electronic memory device, a second risk metric of the second type of surface segment;
determining, based on (i) the amount of time the vehicle spends on the first type of surface segment and (ii) the first risk metric, a first risk exposure;
determining, based on (i) the amount of time the vehicle spends on the second type of surface segment and (ii) the second risk metric, a second risk exposure;
and determining, based at least in part on the first and second risk exposures, an insurance rate for the vehicle.

2. The system of claim 1, wherein the instructions, when executed by the specially-programmed electronic controller device, further result in:
determining first weather condition information for at least one portion of time the vehicle spends on the first type of surface segment; and
determining a first weather risk metric for the first weather condition information for the at least one portion of the time the vehicle spends on the first type of surface segment;

wherein the first risk metric of the first type of surface segment comprises the first weather risk metric.

3. The system of claim 1, wherein the instructions, when executed by the specially-programmed electronic controller device, further result in:
determining second weather condition information for at least one portion of time the vehicle spends on the second type of surface segment; and
determining a second weather risk metric for the second weather condition information for the at least one portion of the time the vehicle spends on the second type of surface segment;
wherein the second risk metric of the second type of surface segment comprises the second weather risk metric.

4. The system of claim 1, wherein the determining of the information descriptive of the amount of time the vehicle spends on the second type of surface segment, comprises:
determining telematic device location information descriptive of the vehicle being located on a surface segment of the second type; and
determining telematic device timing information descriptive of the amount of time the vehicle spends on the surface segment of the second type.

5. The system of claim 1, wherein the insurance rate comprises an initial insurance premium rate plan.

6. The system of claim 1, wherein the insurance rate comprises an adjustment to an initial insurance premium rate plan.

7. The system of claim 1, wherein the first risk metric of the first type of surface segment comprises a risk metric based at least in part on one or more of: (i) a surface material of the first type of surface segment; (ii) a geometric characteristic of the first type of surface segment; (iii) a wildlife condition adjacent to the first type of surface segment; (iv) a construction status of the first type of surface segment; and (v) a lighting characteristic of the first type of surface segment.

8. The system of claim 1, wherein the second risk metric of the second type of surface segment comprises a risk metric based at least in part on one or more of: (i) a surface material of the second type of surface segment; (ii) a geometric characteristic of the second type of surface segment; (iii) a wildlife condition adjacent to the second type of surface segment; (iv) a construction status of the second type of surface segment; and (v) a lighting characteristic of the second type of surface segment.

9. The system of claim 1, wherein the first and second risk metrics are different.

10. The system of claim 1, wherein the insurance rate for the vehicle is further based at least in part on at least one of: (i) a risk exposure of a driver of the vehicle; and (ii) a risk exposure of a vehicle type of the vehicle.

11. An electronically networked system for measuring physical attributes of a roadway, comprising:
an electronic processing device;
an electronic sensor device coupled to an object and in communication with the electronic processing device via a wireless electronic network; and
a non-transitory electronic memory device in communication with the electronic processing device, the non-transitory electronic memory device storing instructions that when executed by the electronic processing device result in:
determining, based on data received via the wireless electronic network and from the electronic sensor device, information descriptive of an amount of time a vehicle spends on a first type of surface segment;
determining, based on data received via the wireless electronic network and from the electronic sensor device, information descriptive of an amount of time the vehicle spends on a second type of surface segment;
determining a first risk metric of the first type of surface segment, wherein the first risk metric of the first type of surface segment comprises a risk metric based at least in part on one or more of: (i) a surface material of the first type of surface segment; (ii) a geometric characteristic of the first type of surface segment; (iii) a wildlife condition adjacent to the first type of surface segment; (iv) a construction status of the first type of surface segment; and (v) a lighting characteristic of the first type of surface segment;
determining a second risk metric of the second type of surface segment;
determining, based on (i) the amount of time the vehicle spends on the first type of surface segment and (ii) the first risk metric, a first risk exposure;
determining, based on (i) the amount of time the vehicle spends on the second type of surface segment and (ii) the second risk metric, a second risk exposure;
determining, based at least in part on the first and second risk exposures, an insurance rate for the vehicle; and
outputting, via a graphical user interface generated by the electronic processing device, a graphical representation of the insurance rate for the vehicle.

12. The electronically networked system of claim 11, wherein the instructions, when executed by the electronic processing device, further result in:
determining first weather condition information for at least one portion of time the vehicle spends on the first type of surface segment; and
determining a first weather risk metric for the first weather condition information for the at least one portion of the time the vehicle spends on the first type of surface segment;
wherein the first risk metric of the first type of surface segment comprises the first weather risk metric.

13. The electronically networked system of claim 11, wherein the instructions, when executed by the electronic processing device, further result in:
determining second weather condition information for at least one portion of time the vehicle spends on the second type of surface segment; and
determining a second weather risk metric for the second weather condition information for the at least one portion of the time the vehicle spends on the second type of surface segment;
wherein the second risk metric of the second type of surface segment comprises the second weather risk metric.

14. The electronically networked system of claim 11, wherein the determining of the information descriptive of the amount of time the vehicle spends on the first type of surface segment, comprises:
determining, by receiving data from a third-party device, credit card purchase transaction location information descriptive of the vehicle being located on a surface segment of the first type; and
determining, by receiving data from a third-party device, credit card purchase transaction timing information descriptive of the amount of time the vehicle spends on the surface segment of the first type.

15. The electronically networked system of claim 11, wherein the determining of the information descriptive of the amount of time the vehicle spends on the first type of surface segment, comprises:
   determining telematic device location information descriptive of the vehicle being located on a surface segment of the first type; and
   determining telematic device timing information descriptive of the amount of time the vehicle spends on the surface segment of the first type.

16. The electronically networked system of claim 11, wherein the insurance rate comprises an initial insurance premium rate plan.

17. The electronically networked system of claim 11, wherein the insurance rate comprises an adjustment to an initial insurance premium rate plan.

18. The electronically networked system of claim 11, wherein the second risk metric of the second type of surface segment comprises a risk metric based at least in part on one or more of: (i) a surface material of the second type of surface segment; (ii) a geometric characteristic of the second type of surface segment; (iii) a wildlife condition adjacent to the second type of surface segment; (iv) a construction status of the second type of surface segment; and (v) a lighting characteristic of the second type of surface segment.

19. The electronically networked system of claim 11, wherein the first and second risk metrics are different.

20. The electronically networked system of claim 11, wherein the insurance rate for the vehicle is further based at least in part on at least one of: (i) a risk exposure of a driver of the vehicle; and (ii) a risk exposure of a vehicle type of the vehicle.

* * * * *